US011007908B2

(12) United States Patent
Gaines et al.

(10) Patent No.: US 11,007,908 B2
(45) Date of Patent: May 18, 2021

(54) UPPER THORACIC SUPPORT PADDLE ATTACHMENT ASSEMBLY

(71) Applicant: FORD GLOBAL TECHNOLOGIES, LLC, Dearborn, MI (US)

(72) Inventors: David William Gaines, Farmington, MI (US); Arya Sabeti, Dearborn, MI (US); Benjamin Kulhawik, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 87 days.

(21) Appl. No.: 16/451,595

(22) Filed: Jun. 25, 2019

(65) Prior Publication Data

US 2020/0406790 A1 Dec. 31, 2020

(51) Int. Cl.
*B60N 2/22* (2006.01)
*B60N 2/68* (2006.01)
*B60N 2/64* (2006.01)

(52) U.S. Cl.
CPC ........... *B60N 2/2222* (2013.01); *B60N 2/643* (2013.01); *B60N 2/682* (2013.01)

(58) Field of Classification Search
CPC ........ B60N 2/222; B60N 2/643; B60N 2/682; A47C 7/46
USPC ...................................................... 297/284.1
See application file for complete search history.

(56) References Cited

U.S. PATENT DOCUMENTS

| | | |
|---|---|---|
| 681,784 A | 9/1901 | Hale |
| 2,576,343 A | 11/1951 | Hibbard et al. |
| 2,797,739 A | 7/1957 | Orsini |
| 3,451,261 A | 6/1969 | Olsen |
| 4,045,082 A | 8/1977 | Egert et al. |
| 4,106,081 A | 8/1978 | Turturici |
| 4,272,119 A | 6/1981 | Adams |
| 4,506,317 A | 3/1985 | Duddy |
| 4,626,028 A | 12/1986 | Hatsutta et al. |
| 4,709,961 A | 12/1987 | Hill |

(Continued)

FOREIGN PATENT DOCUMENTS

| | | |
|---|---|---|
| DE | 19901072 | 3/2000 |
| DE | 102005023602 | 11/2006 |

(Continued)

*Primary Examiner* — Milton Nelson, Jr.
(74) *Attorney, Agent, or Firm* — David Coppiellie; Price Heneveld LLP

(57) ABSTRACT

A seatback assembly includes a pair of lateral seatback assembly frame members and a moveable thoracic back support defining a support surface operably coupled with an upper thoracic support bracket. An attachment assembly operably couples the thoracic back support to the upper thoracic support bracket, and includes a pair of mounting lugs disposed on either of one of the upper thoracic support bracket or the moveable thoracic back support, and a pair of mounting bosses disposed on the other of the upper thoracic support bracket or the thoracic back support. The seatback assembly is assembled by aligning the pair of mounting lugs with the pair of mounting bosses as the moveable thoracic back support is horizontally positioned above the lower seatback insert, whereby the pair of mounting lugs are received within the pair of mounting bosses, and vertically lowering the moveable thoracic back support relative the lower seatback insert.

20 Claims, 12 Drawing Sheets

(56) References Cited

U.S. PATENT DOCUMENTS

| | | | |
|---|---|---|---|
| 4,809,897 A | 3/1989 | Wright, Jr. |
| 4,832,400 A | 5/1989 | Aoki et al. |
| 4,955,571 A | 9/1990 | Lorence et al. |
| 4,977,973 A | 12/1990 | Takizawa |
| 5,003,240 A | 3/1991 | Ikeda |
| 5,011,225 A | 4/1991 | Nemoto |
| 5,011,226 A | 4/1991 | Ikeda et al. |
| 5,015,026 A | 5/1991 | Mouri |
| 5,046,433 A | 9/1991 | Kramer et al. |
| 5,058,953 A | 10/1991 | Takagi et al. |
| 5,092,507 A | 3/1992 | Szablak et al. |
| 5,145,233 A | 9/1992 | Nagashima |
| 5,149,173 A | 9/1992 | Jay et al. |
| 5,297,010 A | 3/1994 | Camarota et al. |
| 5,364,164 A | 11/1994 | Kuranami |
| 5,370,035 A | 12/1994 | Madden, Jr. |
| 5,511,842 A | 4/1996 | Dillon |
| 5,521,806 A | 5/1996 | Hutzel et al. |
| 5,567,011 A | 10/1996 | Sessini |
| 5,732,994 A | 3/1998 | Stancu et al. |
| 5,836,648 A | 11/1998 | Karschin et al. |
| 5,845,965 A | 12/1998 | Heath et al. |
| 6,015,198 A | 1/2000 | Stair |
| 6,032,587 A | 3/2000 | Salenbauch et al. |
| 6,090,148 A | 7/2000 | Weber et al. |
| 6,096,086 A | 8/2000 | Weber et al. |
| 6,110,216 A | 8/2000 | Weber et al. |
| 6,123,377 A | 9/2000 | Lecher et al. |
| 6,135,558 A | 10/2000 | Behrens et al. |
| 6,135,561 A | 10/2000 | Kruger et al. |
| 6,183,033 B1 | 2/2001 | Arai et al. |
| 6,213,549 B1 | 4/2001 | Wieclawski |
| 6,220,660 B1 | 4/2001 | Bedro et al. |
| 6,273,511 B1 | 8/2001 | Wieclawski |
| 6,347,590 B1 | 2/2002 | D'Annunzio et al. |
| 6,419,314 B1 | 7/2002 | Scheerhorn |
| 6,439,636 B1 | 8/2002 | Kuo |
| 6,478,373 B1 | 11/2002 | Hake et al. |
| 6,547,323 B1 | 4/2003 | Aitken et al. |
| 6,565,150 B2 | 5/2003 | Fischer et al. |
| 6,565,153 B2 | 5/2003 | Hensel et al. |
| 6,601,901 B1 | 8/2003 | Schambre et al. |
| 6,709,060 B1* | 3/2004 | Su .................. A47C 7/40 297/440.2 |
| 6,719,343 B2 | 4/2004 | Emerling et al. |
| 6,719,367 B2 | 4/2004 | Mic et al. |
| 6,719,368 B1 | 4/2004 | Neale |
| 6,746,065 B1 | 6/2004 | Chan |
| 6,761,388 B2 | 7/2004 | Lein et al. |
| 6,848,817 B2 | 2/2005 | Bos et al. |
| 7,021,694 B1 | 4/2006 | Roberts et al. |
| 7,025,420 B2 | 4/2006 | Guinea Pena et al. |
| 7,055,904 B2 | 6/2006 | Skelly et al. |
| 7,077,472 B2 | 7/2006 | Steffens, Jr. |
| 7,080,865 B2 | 7/2006 | Bergeron et al. |
| 7,114,755 B1 | 10/2006 | Sturt et al. |
| 7,192,070 B2 | 3/2007 | Radu et al. |
| 7,270,452 B2 | 9/2007 | Wang |
| 7,278,681 B2 | 10/2007 | Lilov et al. |
| 7,293,507 B2 | 11/2007 | DePue et al. |
| 7,296,839 B2 | 11/2007 | Scheerhorn |
| 7,322,646 B2 | 1/2008 | Jammalamadaka et al. |
| 7,328,818 B2 | 2/2008 | Prabucki |
| 7,364,231 B2 | 4/2008 | Park et al. |
| 7,393,052 B2 | 7/2008 | Humer et al. |
| 7,431,365 B2 | 10/2008 | Sturt et al. |
| 7,441,838 B2 | 10/2008 | Patwardhan |
| 7,455,016 B2 | 11/2008 | Perin |
| 7,520,552 B2 | 4/2009 | Nakamura et al. |
| 7,523,888 B2 | 4/2009 | Ferry et al. |
| 7,537,364 B2 | 5/2009 | Misawa et al. |
| 7,641,252 B2 | 1/2010 | Sturt et al. |
| 7,644,982 B2 | 1/2010 | Paluch |
| 7,748,762 B2 | 7/2010 | Mayne, Jr. |
| 7,770,953 B2 | 8/2010 | Koarai |
| 7,793,597 B2 | 9/2010 | Bart et al. |
| 7,798,072 B2 | 9/2010 | Becker et al. |
| 7,834,750 B1 | 11/2010 | Hertz et al. |
| 7,845,729 B2 | 12/2010 | Yamada et al. |
| 7,857,381 B2 | 12/2010 | Humer et al. |
| 7,891,696 B2 | 2/2011 | Hanson |
| 7,934,762 B2 | 5/2011 | Hollenbeck et al. |
| 8,002,323 B2 | 8/2011 | Jones et al. |
| 8,033,610 B2 | 10/2011 | Graber et al. |
| 8,052,194 B2 | 11/2011 | Sayama |
| 8,104,836 B2 | 1/2012 | Little |
| 8,109,565 B2 | 2/2012 | Waters et al. |
| 8,141,930 B2 | 3/2012 | Sayama |
| 8,167,366 B2 | 5/2012 | Charpentier et al. |
| 8,177,281 B2 | 5/2012 | Sayama |
| 8,201,890 B1 | 6/2012 | Nagoaka Mihara |
| 8,262,164 B2 | 9/2012 | Ito et al. |
| 8,287,024 B2 | 10/2012 | Sayama |
| 8,287,037 B2 | 10/2012 | Sayama |
| 8,336,955 B2 | 12/2012 | Sayama |
| 8,388,054 B2 | 3/2013 | Sayama |
| 8,397,963 B2 | 3/2013 | Singh |
| 8,421,407 B2 | 4/2013 | Johnson |
| 8,449,029 B2 | 5/2013 | Runde |
| 8,496,295 B2 | 7/2013 | Chen |
| 8,528,987 B2 | 9/2013 | Purpura et al. |
| 8,534,750 B2 | 9/2013 | Sayama |
| 8,540,308 B2 | 9/2013 | Aoki et al. |
| 8,876,206 B2* | 11/2014 | Yamaguchi ........ B60N 2/42745 297/230.12 |
| 8,899,683 B2 | 12/2014 | Ito et al. |
| 8,998,327 B2 | 4/2015 | Cooney |
| 9,105,809 B2 | 8/2015 | Lofy |
| 9,150,152 B2 | 10/2015 | Sura et al. |
| 9,168,850 B2 | 10/2015 | Meszaros et al. |
| 9,187,019 B2 | 11/2015 | Dry et al. |
| 9,205,774 B2 | 12/2015 | Kennemer et al. |
| 9,381,840 B2 | 7/2016 | Tobata et al. |
| 9,399,418 B2 | 7/2016 | Line et al. |
| 9,421,894 B2 | 8/2016 | Line et al. |
| 9,452,838 B2 | 9/2016 | Meister et al. |
| 9,566,888 B2 | 2/2017 | Kolich et al. |
| 9,573,502 B2 | 2/2017 | Seki et al. |
| 9,596,940 B2 | 3/2017 | Petzel et al. |
| 9,610,872 B2 | 4/2017 | Dry et al. |
| 9,649,962 B2 | 5/2017 | Line et al. |
| 9,776,533 B2 | 10/2017 | Line et al. |
| 10,065,535 B1 | 9/2018 | Line et al. |
| 2002/0060485 A1* | 5/2002 | Fischer .................. B60N 2/99 297/284.4 |
| 2004/0012234 A1 | 1/2004 | Yamaguchi et al. |
| 2004/0070240 A1 | 4/2004 | Haland et al. |
| 2005/0017561 A1 | 1/2005 | Burmeister, III et al. |
| 2005/0120477 A1 | 6/2005 | Kennan |
| 2005/0225145 A1 | 10/2005 | Furtado et al. |
| 2005/0280296 A1 | 12/2005 | Ohchi et al. |
| 2006/0006709 A1 | 1/2006 | Uno et al. |
| 2006/0071517 A1 | 4/2006 | Humer et al. |
| 2006/0100764 A1 | 5/2006 | Adams et al. |
| 2006/0202524 A1 | 9/2006 | Yamaguchi |
| 2006/0202525 A1 | 9/2006 | Yamaguchi |
| 2006/0208517 A1 | 9/2006 | Nakamura et al. |
| 2007/0170281 A1 | 7/2007 | Cooper et al. |
| 2007/0205622 A1 | 9/2007 | Whitens et al. |
| 2008/0012402 A1 | 1/2008 | Sekida |
| 2008/0073950 A1 | 3/2008 | Ko |
| 2008/0084098 A1 | 4/2008 | Humer et al. |
| 2008/0088158 A1* | 4/2008 | Yokota .................. B60N 2/888 297/216.12 |
| 2008/0110931 A1 | 5/2008 | Pabrucki |
| 2008/0129093 A1* | 6/2008 | Kim ...................... B60N 2/888 297/216.12 |
| 2008/0231067 A1 | 9/2008 | Nagle |
| 2009/0167066 A1 | 7/2009 | Mori et al. |
| 2009/0174206 A1 | 7/2009 | VanderSluis et al. |
| 2009/0309398 A1 | 12/2009 | Niitsuma et al. |
| 2010/0026060 A1 | 2/2010 | Niitsuma et al. |
| 2010/0066135 A1 | 3/2010 | Humer et al. |
| 2010/0066136 A1 | 3/2010 | D'Agostini |

(56) References Cited

U.S. PATENT DOCUMENTS

| | | |
|---|---|---|
| 2010/0090505 A1 | 4/2010 | Tarusawa et al. |
| 2010/0127540 A1 | 5/2010 | Park et al. |
| 2010/0148545 A1 | 6/2010 | Omori |
| 2010/0187875 A1 | 7/2010 | Sasaki et al. |
| 2010/0201167 A1* | 8/2010 | Wieclawski ......... B60N 2/2222 297/216.13 |
| 2010/0207414 A1 | 8/2010 | Tsuda et al. |
| 2010/0244478 A1 | 9/2010 | Depue |
| 2010/0264704 A1 | 10/2010 | Yasuda et al. |
| 2010/0270834 A1 | 10/2010 | Niitsuma |
| 2010/0270835 A1 | 10/2010 | Niitsuma |
| 2010/0295348 A1 | 11/2010 | Takayasu et al. |
| 2010/0308629 A1 | 12/2010 | Lee et al. |
| 2011/0187167 A1 | 8/2011 | Takayasu et al. |
| 2011/0272978 A1 | 11/2011 | Niitsuma |
| 2012/0068517 A1 | 3/2012 | Yetukuri et al. |
| 2012/0198616 A1 | 8/2012 | Makansi et al. |
| 2012/0212016 A1 | 8/2012 | Kanda |
| 2013/0153055 A1 | 6/2013 | Gaffoglio |
| 2014/0203611 A1 | 7/2014 | Kondrad et al. |
| 2014/0203614 A1 | 7/2014 | Line et al. |
| 2014/0203615 A1 | 7/2014 | Little |
| 2014/0368015 A1 | 12/2014 | Basters et al. |
| 2016/0355114 A1 | 12/2016 | Line et al. |
| 2018/0251052 A1 | 9/2018 | Line et al. |

FOREIGN PATENT DOCUMENTS

| | | |
|---|---|---|
| DE | 102015116487 | 4/2016 |
| EP | 2769904 | 8/2014 |
| FR | 2833220 | 10/1938 |
| FR | 2698594 | 6/1994 |
| JP | H0775608 | 3/1995 |
| WO | 2006067460 | 6/2006 |
| WO | 200144420 | 12/2010 |
| WO | 2016070052 | 5/2016 |

\* cited by examiner

UPPER THORACIC SUPPORT PADDLE ATTACHMENT ASSEMBLY

FIELD OF THE INVENTION

The present invention generally relates to an apparatus and method for providing a motor vehicle seating assembly adapted to assume a first configuration to provide conventional support in the operation of motor vehicle, and adapted to assume a second configuration to provide a relatively level supine platform upon which an occupant might lie when the motor vehicle is not in operation and, more particularly, to an attachment assembly for a moveable thoracic back support.

BACKGROUND OF THE INVENTION

Seating assemblies provided in motor vehicles are designed to provide a support platform designed to accommodate an occupant in a sitting position. When the vehicle is parked and the seating assembly is reclined into a resting/sleeping position, it is also desired to design the seating assembly to support the occupant in this position.

SUMMARY OF THE INVENTION

According to one aspect of the present invention, a seatback assembly comprises a pair of lateral seatback assembly frame members and a lower seatback insert and a moveable thoracic back support defining a support surface operably coupled with a moveable upper thoracic support bracket operably attached to the pair of lateral seatback assembly frame members, the moveable upper thoracic support bracket being selectively positioned in one of a plurality of positions between a fully stowed position and a fully raised position. An attachment assembly operably couples the moveable thoracic back support to the moveable upper thoracic support bracket. The attachment assembly comprises a pair of mounting lugs, one each of which is disposed on either of one of the moveable upper thoracic support bracket or the moveable thoracic back support, and a pair of mounting bosses, one each of which is disposed on the other of the moveable upper thoracic support bracket or the moveable thoracic back support, wherein the pair of mounting lugs may be aligned with the pair of mounting bosses as the moveable thoracic back support is horizontally positioned above the lower seatback insert and the pair of mounting lugs are received within the pair of mounting bosses as the moveable thoracic back support is vertically lowered relative the lower seatback insert during assembly of the seatback assembly.

Embodiments of the first aspect of the present disclosure can include any one or a combination of the following features:

- The moveable upper thoracic support bracket comprises a pair of upwardly and vertically extending lateral sections interconnected via a substantially horizontal central section to form a substantially U-shaped and upwardly extending frame within a plane of the seatback assembly when in the stowed position, and the moveable thoracic back support comprises a pair of vertically depending legs.
- One of the pair of mounting lugs is disposed on each of the pair of upwardly and vertically extending lateral sections of the moveable upper thoracic support bracket and is operably coupled to the pair of upwardly and vertically extending lateral sections of the moveable upper thoracic support bracket via a connecting web, and one of the pair of mounting bosses is disposed on each of the pair of vertically depending legs of the thoracic back support.
- An outer casing is disposed about an upper portion of the pair of upwardly and vertically extending lateral sections and the substantially horizontal central section of the moveable upper thoracic support bracket, wherein the pair of mounting lugs is disposed on the upper portion of the pair of upwardly and vertically extending lateral sections of the moveable upper thoracic support bracket.
- The outer casing is injection over-molded about the upper portion of the pair of upwardly and vertically extending lateral sections and the substantially horizontal central section of the moveable upper thoracic support bracket, and the pair of mounting lugs is injection over-molded proximate the pair of upwardly and vertically extending lateral sections of the moveable upper thoracic support bracket.
- Each of the pair of mounting bosses comprises a vertical tube having an open passage at a lower distal end, a stop at an upper proximal end, and a vertical slot on a side portion of the vertical tube extending between the open passage at the lower distal end and the stop at the upper proximal end, and wherein each of the pair of mounting lugs is received within a corresponding one of the pair of mounting bosses via the open passage at the lower distal end and the connecting web of the moveable upper thoracic support bracket is received within the vertical slot, whereby each of the pair of mounting lugs may be inserted into the vertical tube of the corresponding one of the pair of mounting bosses until an upper edge of the connecting web is disposed in juxtaposed abutting relation with the stop at the upper proximal end of the vertical tube.
- The vertical tube forms a substantially cylindrical interior cavity within which each of the pair of mounting lugs is received.
- The vertical tube forms a substantially rectangular interior cavity within which each of the pair of mounting lugs is received.
- A locator plane is disposed proximate the open passage at the lower distal end of the vertical tube by which the moveable thoracic back support may be positioned prior to being vertically lowered relative the lower seatback insert during assembly of the seatback assembly.
- Each one of the pair of mounting lugs comprises a plurality of mounting lugs arranged in spaced vertical relation with each other and each one of the pair of mounting bosses comprises a plurality of mounting bosses arranged in spaced vertical relation with each other, and wherein a spacing between the plurality of mounting lugs and a spacing between the plurality of mounting bosses allows the plurality of mounting bosses to be placed in vertical alignment with the plurality of mounting lugs prior to being vertically lowered relative the lower seatback insert during assembly of the seatback assembly.
- Each of the pair of mounting bosses comprises a vertical tube having an open passage at a lower distal end, a stop at an upper proximal end, and a vertical slot on a side portion of the vertical tube extending between the open passage at the lower distal end and the stop at the upper proximal end, and wherein each of the pair of mounting lugs is received within a corresponding one of the pair of mounting bosses via the open passage at the lower distal end and the connecting web of the moveable upper thoracic support bracket is received within the vertical slot, whereby each of the pair of mounting lugs may be inserted into the vertical tube of the corresponding one of the pair of mounting bosses until an upper edge of the connecting web is disposed in juxtaposed abutting relation with the stop at the upper proximal end of the vertical tube.

Each of the pair of mounting lugs is disposed on an outer side of each of the pair of upwardly and vertically extending lateral sections of the moveable upper thoracic support bracket and the vertical slot on the side portion of the vertical tube of each of the pair of mounting bosses is disposed on an inner side of the pair of vertically depending legs of the thoracic back support.

The seatback insert has an outer trim defining a first support surface and the moveable thoracic back support has an outer trim defining a second support surface, and wherein the first support surface and second support surface are substantially co-planar when the moveable upper thoracic support bracket is in the fully stowed position and the second support surface is raised above the first support surface when the moveable upper thoracic support bracket is not positioned in the fully stowed position.

A latch operably couples a first end of the moveable upper thoracic support bracket to the one of the pair of lateral seatback assembly frame members to restrain the moveable upper thoracic support bracket in one of the plurality of positions between the stowed position and the fully raised position.

According to another aspect of the present invention, a motor vehicle seating assembly comprises a seatback assembly comprising a lower seatback insert and pivotable between an upright position and a fully reclined position operably coupled with a lower seating structure, the seatback assembly comprising a frame having a pair of opposed lateral seatback assembly frame members. A moveable thoracic back support is operably coupled with a moveable upper thoracic support bracket pivotally attached at a first end to one of the pair of opposed lateral seatback assembly frame members and pivotally attached at a second end to the other of the pair of opposed lateral seatback assembly frame members, a pair of mounting bosses is disposed on each of a pair of vertically depending legs, a latch operably coupling a first end of the moveable upper thoracic support bracket to the one of a pair of opposed lateral seatback assembly frame members to restrain the moveable upper thoracic support bracket in one of a plurality of positions between a stowed position and a fully raised position, and a cushion defining a moveable surface of the moveable thoracic back support, wherein the moveable upper thoracic support bracket comprises a pair of upwardly and vertically extending lateral sections interconnected via a substantially horizontal central section to form a substantially U-shaped and upwardly extending frame within a plane of the seatback assembly when in the stowed position. An attachment assembly operably coupling the moveable thoracic back support to the moveable upper thoracic support bracket, the attachment assembly comprises a pair of mounting lugs, one each of which is disposed on either of one of the pair of vertically extending lateral sections of the moveable upper thoracic support bracket or one of the pair of vertically depending legs of the moveable thoracic back support, and a pair of mounting bosses, one each of which is disposed on either of the other one of the pair of vertically extending lateral sections of the moveable upper thoracic support bracket or the other one of the pair of vertically depending legs of the moveable thoracic back support, wherein the pair of mounting lugs are aligned with the pair of mounting bosses as the moveable thoracic back support is horizontally positioned above the lower seatback insert and the pair of mounting lugs are received within the pair of mounting bosses as the moveable thoracic back support is vertically lowered relative the lower seatback insert during assembly of the seatback assembly.

Embodiments of the second aspect of the present disclosure can include any one or a combination of the following features:

Each one of the pair of mounting lugs comprises a plurality of mounting lugs arranged in spaced vertical relation with each other and each one of the pair of mounting bosses comprises a plurality of mounting bosses arranged in spaced vertical relation with each other, and wherein a spacing between the plurality of mounting lugs and a spacing between the plurality of mounting bosses allows the plurality of mounting bosses to be placed in vertical alignment with the plurality of mounting lugs prior to being vertically lowered relative the lower seatback insert during assembly of the seatback assembly, and one of the pair of mounting lugs is disposed on each of the pair of upwardly and each one of the pair of mounting lugs is operably coupled to the pair of upwardly and vertically extending lateral sections of the moveable upper thoracic support bracket via a connecting web. Each of the pair of mounting bosses comprises a vertical tube having an open passage at a lower distal end, a stop at an upper proximal end, and a vertical slot on a side portion of the vertical tube extending between the open passage at the lower distal end and the stop at the upper proximal end, and wherein each of the pair of mounting lugs is received within a corresponding one of the pair of mounting bosses via the open passage at the lower distal end and the connecting web of the moveable upper thoracic support bracket is received within the vertical slot, whereby each of the pair of mounting lugs may be inserted into the vertical tube of the corresponding one of the pair of mounting bosses until an upper edge of the connecting web is disposed in juxtaposed abutting relation with the stop at the upper proximal end of the vertical tube.

Each one of the pair of mounting lugs comprises a vertically oriented hole on a top end thereof and the upper proximal end of each of the pair of mounting bosses comprises a top wall through which extends a corresponding and aligned vertically oriented hole relative the vertically oriented hole on the top end of each one of the pair of mounting lugs, whereby each one of the pair of mounting lugs can be fastened to each one of the pair of mounting bosses during assembly of the seatback assembly.

According to yet another aspect of the present invention, a method is disclosed for assembling a seatback assembly comprising a pair of lateral seatback assembly frame members, a lower seatback insert, a moveable upper thoracic support bracket pivotally attached at a first end to one of the pair of lateral seatback assembly frame members and pivotally attached at a second end to the other of the pair of lateral seatback assembly frame members, the moveable upper thoracic support bracket being selectively positioned in one of a plurality of positions between a fully stowed position and a fully raised position, a moveable thoracic back support defining a support surface operably coupled with the moveable upper thoracic support bracket, and an attachment assembly operably coupling the moveable thoracic back support to the moveable upper thoracic support bracket, the attachment assembly comprising a pair of mounting lugs, each of which is disposed on either the moveable upper thoracic support bracket or the moveable thoracic back support, and a pair of mounting bosses, each of which is disposed on the other of the moveable upper thoracic support bracket or the moveable thoracic back support. The method comprises the steps of horizontally positioning the moveable thoracic back support above the lower seatback insert, aligning the pair of mounting lugs with the pair of mounting bosses, positioning the moveable thoracic back support such that the pair of mounting lugs are received within the pair of mounting bosses, vertically lowering the moveable thoracic back support relative the lower seatback insert until the pair of mounting lugs are seated within the pair of mounting bosses, and attaching the pair of mounting lugs to the pair of mounting bosses.

Embodiments of the third aspect of the present disclosure can include any one or a combination of the following features:

- Each one of the pair of mounting lugs comprises a plurality of mounting lugs arranged in spaced vertical relation with each other and each one of the pair of mounting bosses comprises a plurality of mounting bosses arranged in spaced vertical relation with each other, and wherein a spacing between the plurality of mounting lugs and a spacing between the plurality of mounting bosses allows the plurality of mounting bosses to be placed in vertical alignment with the plurality of mounting lugs prior to being vertically lowered relative the lower seatback insert, and each of the pair of mounting bosses comprises a vertical tube having an open passage at a lower distal end, a stop at an upper proximal end, and a vertical slot on a side portion of the vertical tube extending between the open passage at the lower distal end and the stop at the upper proximal end. whereby the step of positioning the moveable thoracic back support such that the pair of mounting lugs are received within the pair of mounting bosses further includes the further step of positioning a connecting web on each of the pair of mounting lugs within the vertical slot on a corresponding each of the pair of mounting bosses, and the step of further vertically lowering the moveable thoracic back support relative the lower seatback insert until the pair of mounting lugs are seated within the pair of mounting bosses is completed upon an upper edge of the connecting web of each of the pair of mounting lugs is disposed in juxtaposed abutting relation with the stop at the upper proximal end of the vertical tube.

- A locator plane is disposed proximate the open passage at the lower distal end of the vertical tube, and whereby the step of vertically positioning the moveable thoracic back support such that the pair of mounting lugs are received within the pair of mounting bosses is completed by placing the locator plane upon an upper end of the mounting lug prior to the step of further vertically lowering the moveable thoracic back support relative the lower seatback insert until the pair of mounting lugs are seated within the pair of mounting bosses.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
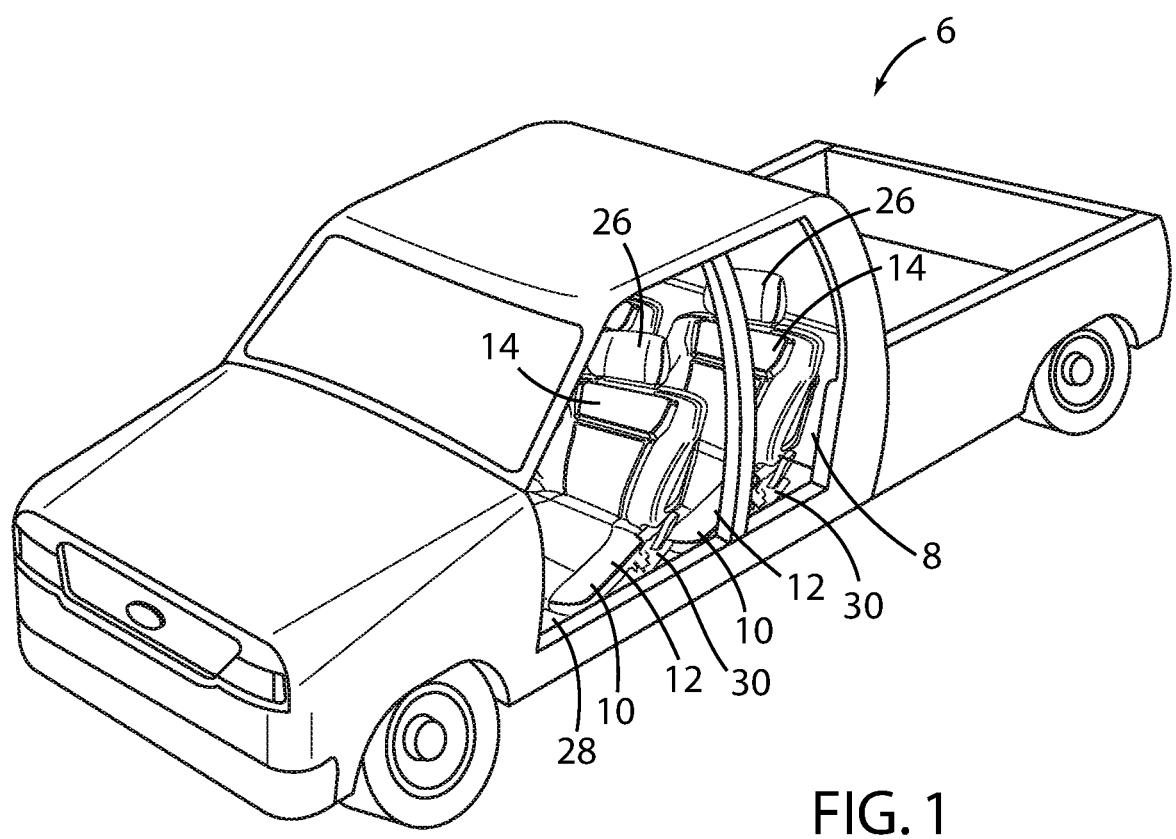
FIG. 1 is a front side perspective view of an automotive seat assembly installed in a motor vehicle in accordance with the present disclosure, wherein the seatback assembly of the front seating assembly is in the upright position.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
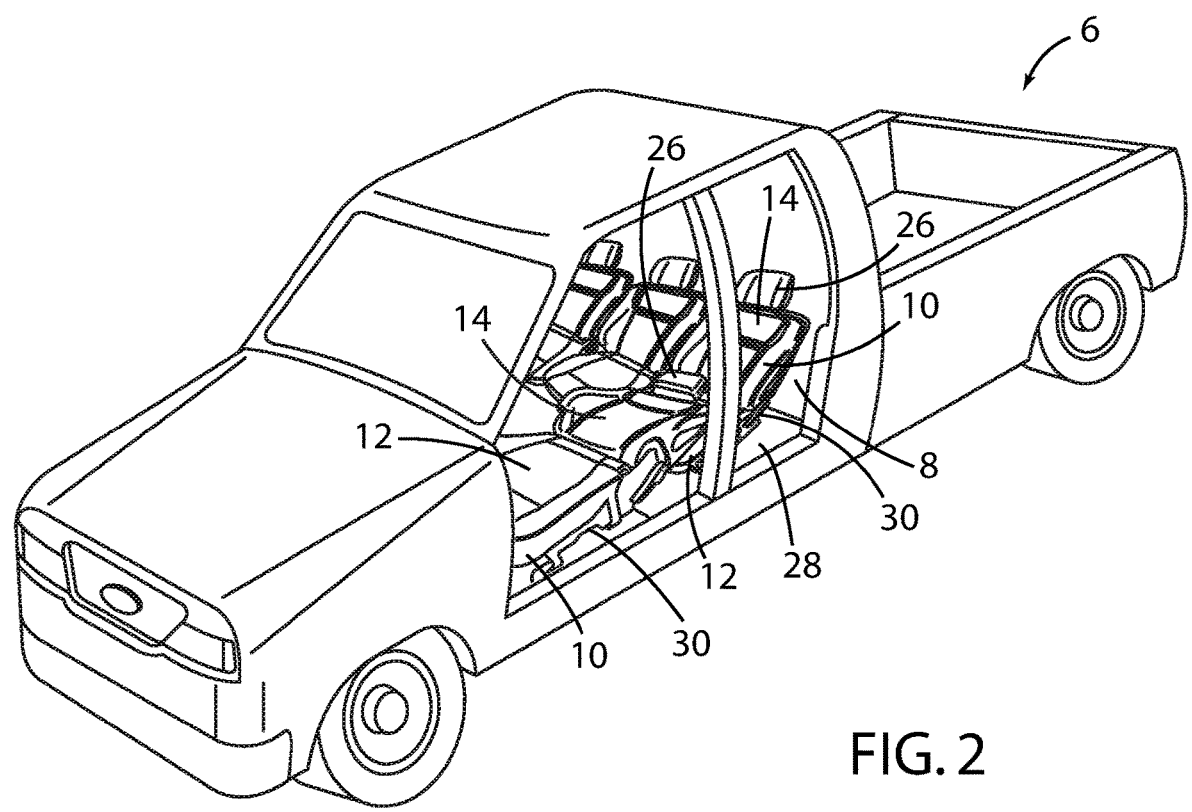
FIG. 2 is a front side perspective view of the automotive seat assembly of FIG. 1 installed in a motor vehicle, wherein the seatback assembly of the front seating assembly is in the fully reclined position.

Referring to FIGS. 1 through 4, reference numeral 10 generally designates a vehicle seating assembly for use in a vehicle cabin 8 of a motor vehicle 6. The motor vehicle seating assembly 10 includes a lower seating structure 12 pivotably coupled to a raised seatback assembly 14. As shown in FIGS. 1-2, the motor vehicle seating assembly 10 is generally configured for use in a variety of motor vehicles 6 in a front driver seat, a front passenger seat, or a rear seat of the motor vehicle 6 and generally includes the aforementioned lower seating structure 12 and raised seatback assembly 14. A head restraint 26 is also mounted to the top of the raised seatback assembly 14. The motor vehicle seating assembly 10 may be configured to be mounted on a support surface, such as a floor pan 28 of the motor vehicle 6. A seat track assembly 30 may be coupled to the lower seating structure 12 to facilitate fore and aft positioning of the motor vehicle seating assembly 10, as is known. The motor vehicle seating assembly 10 is generally designed for the comfort of a motor vehicle occupant, as well as to accommodate and protect the motor vehicle occupant during a collision event.

Figure 3:
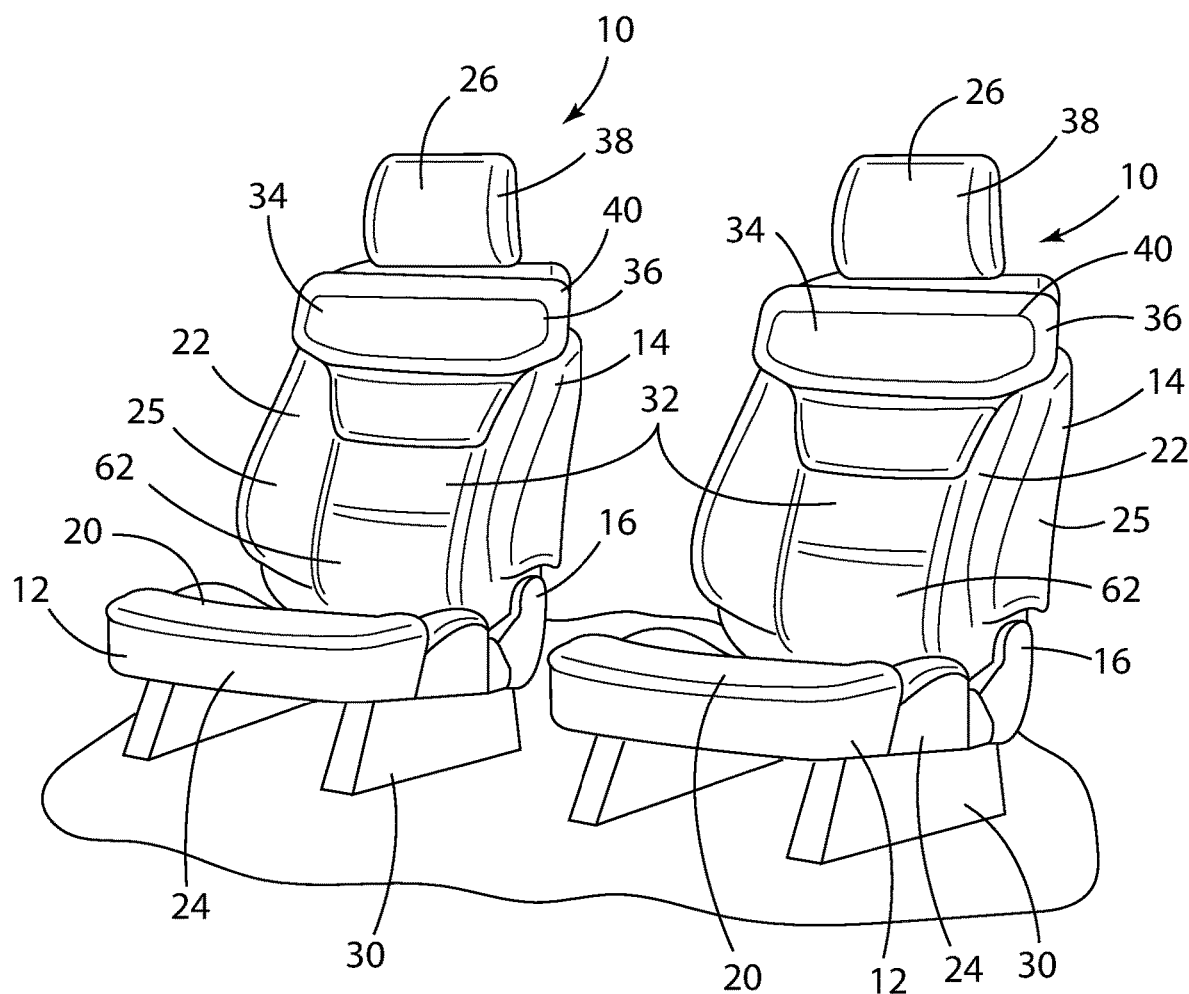
FIG. 3 is a front side perspective view of the automotive seat assembly of FIG. 1, wherein the seatback assembly of the front seating assembly is in the upright position.
Figure 4:
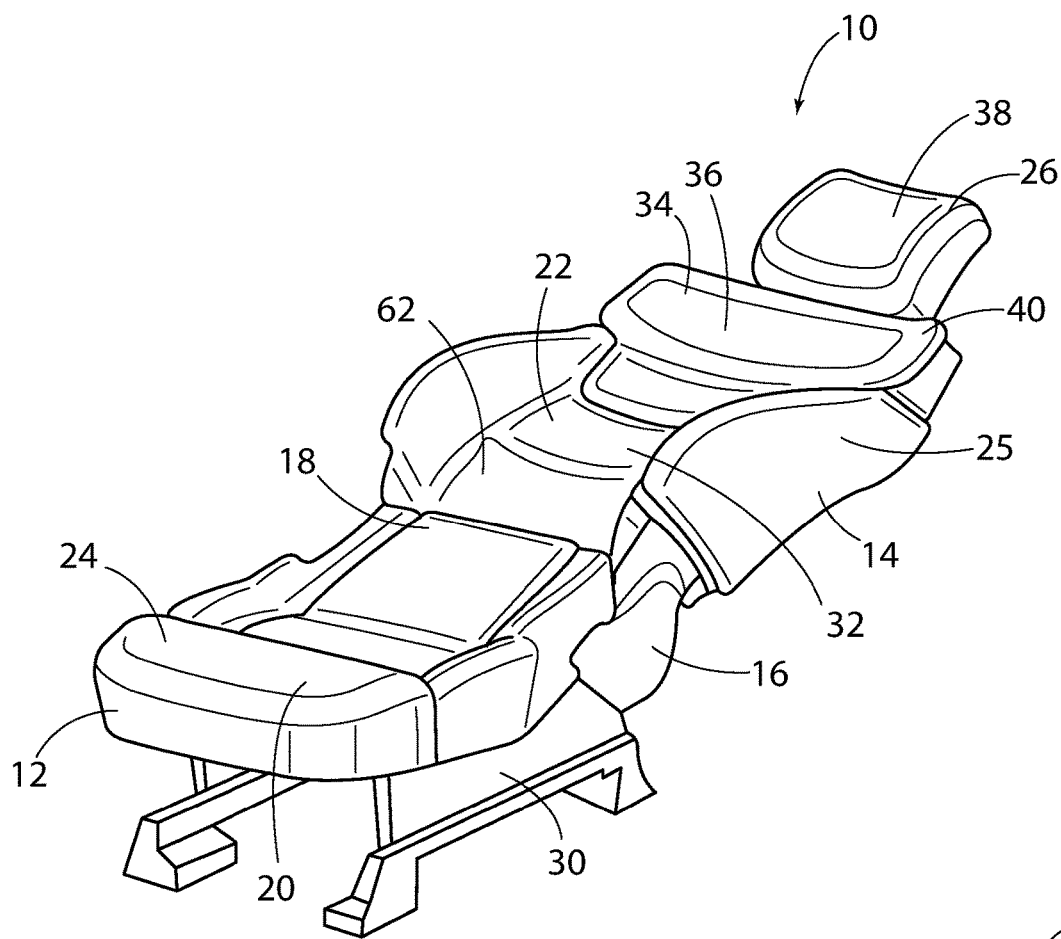
FIG. 4 is a front side perspective view of the automotive seat assembly of FIG. 1, wherein the seatback assembly is in the fully reclined position and the moveable thoracic back support is in its stowed position.
Figure 5:
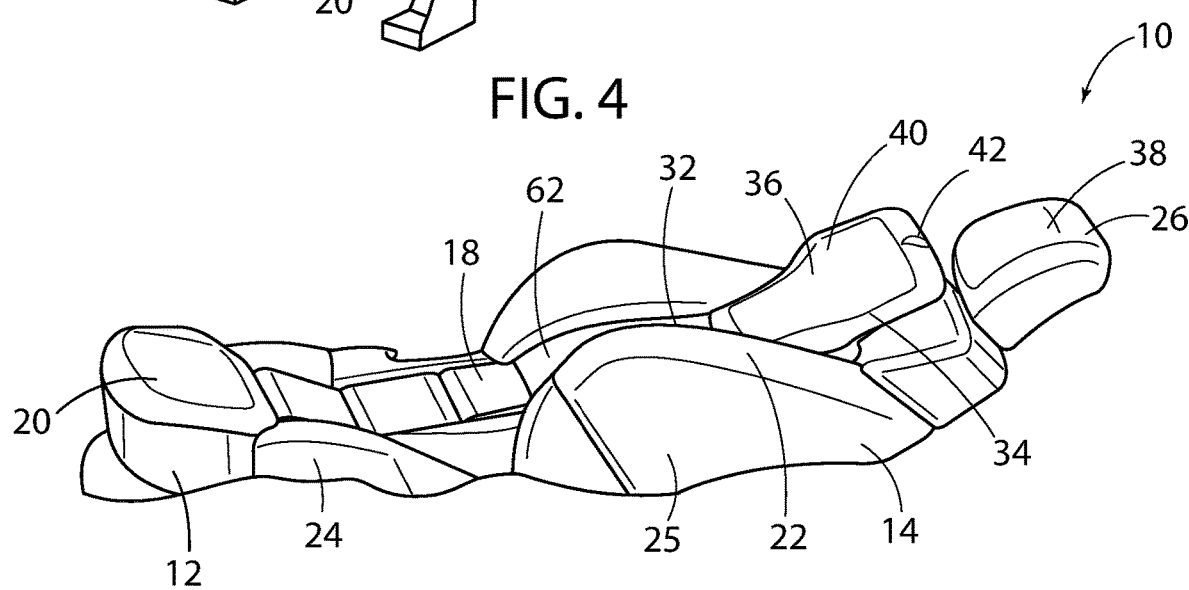
FIG. 5 is a front side perspective view of the automotive seat assembly of FIG. 1, wherein the seatback assembly is in the fully reclined position and the moveable thoracic back support is in its fully raised position.

As shown in FIGS. 1 through 5, the seatback assembly 14 is pivotable between an upright position and a fully reclined position and is operably coupled with the lower seating structure 12 via a pivot 16. The motor vehicle seating assembly 10 may also include a hip lifter mechanism (not shown) and as disclosed in application Ser. No. 15/486,445, published as US 2018/0251052 A1 on Sep. 6, 2018, the contents of which are hereby incorporated in their entirety. Preferably, the hip lifter mechanism raises the rear edge 18 of the lower seating structure 12. The result is a substantially planar and continuous surface between the lower seating structure 12 and seatback assembly 14, respectively, as shown in FIG. 5. Thus, to the extent that a motor vehicle occupant desires a supine position to rest when the motor vehicle 6 is not in operation, the aforementioned disclosure provides a platform upon which the motor vehicle occupant may rest. In accordance with the aforementioned disclosure, a sleeping seat surface is provided by raising the height of the rear edge 18 of the lower seating structure 12 to make the overall surface more level and the transition from the lower seating structure 12 to the seatback assembly 14 less noticeable.

As best shown in FIGS. 3 and 4, each of the lower seating structure 12 and the seatback assembly 14 have an exposed surface 20, 22, respectively. Preferably, the exposed surfaces 20, 22 comprise a locally flexible/stretch trim material relative to a cushion foam and trim assembly 24, 25 of the lower seating structure 12 and the seatback assembly 14, respectively, that may be moved in order to keep the trim material and foam of the cushion foam and trim assembly 24, 25 in tension to maintain a flat surface and eliminate wrinkling.

The motor vehicle seating assembly 10 described above can further include a moveable thoracic back support 40 that can be raised above a lower seatback insert 32 having an outer trim within a range of a plurality of positions, between a stowed position and a fully raised position, where a moveable cushion 34 is attached to and disposed above the moveable thoracic back support 40 to form the exposed surface 22 of the seatback assembly 14. The lower seatback insert 32 may include an outer trim defining a first support surface 62. The moveable cushion 34 disposed above the moveable thoracic back support 40 forms a moveable second surface 36, which may be similarly fabricated as a trim and foam pad assembly to provide a finished look, where the trim is fabricated locally with a resilient, stretchable, or flexible fabric material that allows the moveable thoracic back support 40 to readily move relative the seatback assembly 14. The use of a resilient trim material disposed about the foam pad further maintains a flat moveable second surface 36 and eliminates wrinkling between the stowed position and the fully raised position. The first support surface 62 and moveable second surface 36 are substantially co-planar when the moveable thoracic back support 40 is in the fully stowed position and the moveable second surface 36 is raised above the first support surface 62 when the moveable thoracic back support 40 is not positioned in the fully stowed position.

As shown in FIGS. 3 through 6, the moveable thoracic back support 40 is disposed vertically above the lower seatback insert 32 and below the head restraint 26. Thus disposed, the moveable thoracic back support 40 is designed to provide support between the shoulder blades of the motor vehicle occupant to reduce muscle stress and increase neck blood flow. Similarly, as shown in FIGS. 3 and 4, the seatback assembly 14 further includes the head restraint 26, which itself forms a third surface 38. The moveable cushion 34 disposed above and attached to the moveable thoracic back support 40 forms the moveable second surface 36. With the moveable thoracic back support 40 in the fully raised position, the moveable second surface 36 of the moveable thoracic back support 40 and the third surface 38 of the head restraint 26, respectively, form a substantially planar surface, as seen in FIG. 4.

The moveable thoracic back support 40 is preferably controlled manually by pulling the moveable thoracic back support 40 forward relative the seatback assembly 14. In one embodiment, the moveable thoracic back support 40 is moved from the stowed position to one of the plurality of positions by simply grasping the moveable cushion 34 of the moveable thoracic back support 40 and manually pulling the moveable thoracic back support 40 forward to its desired raised position. The moveable thoracic back support 40 may also include a pull strap 42 by which the moveable thoracic back support 40 is pulled forward relative the seatback assembly 14, as shown in FIG. 5. Alternatively, the moveable thoracic back support 40 may be positioned by an electrical motor assembly and remote switch assembly (not shown).

Figure 6:
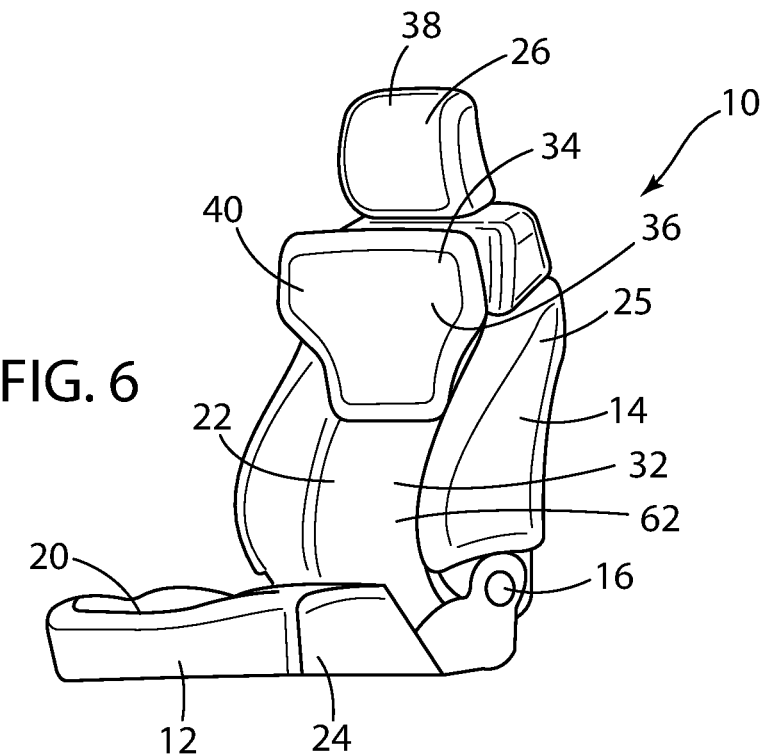
FIG. 6 is a front side perspective view of the automotive seat assembly of FIG. 1, wherein the seatback assembly is in the upright position and the moveable thoracic back support is in its fully raised position.

In its stowed position, the moveable thoracic back support 40 is preferably about 0° relative the plane of the seatback assembly 14. Conversely, in the fully raised position, the moveable thoracic back support 40 may be raised to an appropriate angle, such as about 15°, relative the plane of the seatback assembly 14, as shown in FIGS. 5 and 6. A ratchet latch 44 provides a plurality of positions of the moveable thoracic back support 40, and may provide a plurality of discrete positions in regular intervals between the stowed position and the fully raised position.

Thus, as noted above and as further described herein, the third surface 38 of the head restraint 26 and the moveable second surface 36 of the moveable thoracic back support 40 are capable of forming a substantially continuous plane when the moveable thoracic back support 40 is in the raised position. The moveable thoracic back support 40 accordingly provides many of the desirable features noted above.

An aspect of the present disclosure is the ability to readily assemble the moveable thoracic back support 40 onto the seatback assembly 14. That is, an enhanced assembly method is required to assemble the seatback assembly 14, with the moveable thoracic back support 40 being placed onto the seatback assembly 14 after the foam and trim cushion assembly 25 for the rest of the seatback assembly 14 are already assembled.

Figure 7:
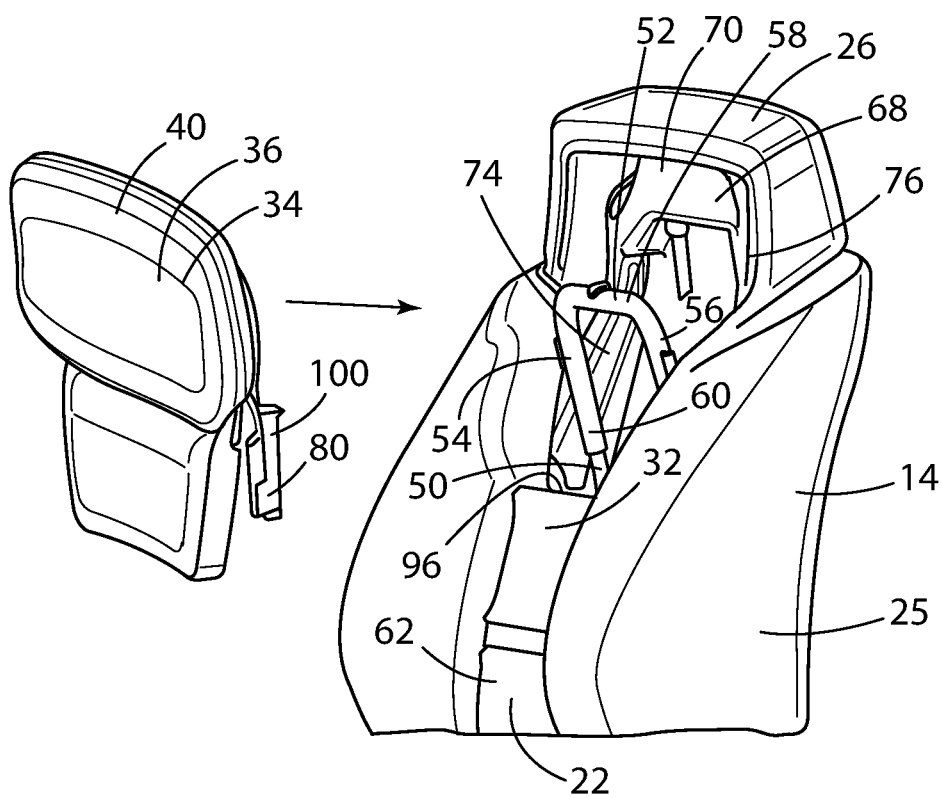
FIG. 7 is an exploded front side perspective view of the automotive seat assembly of FIG. 1, wherein the seatback assembly is in the upright position and the moveable thoracic back support is detached from the seatback assembly prior to assembly.
Figure 8:
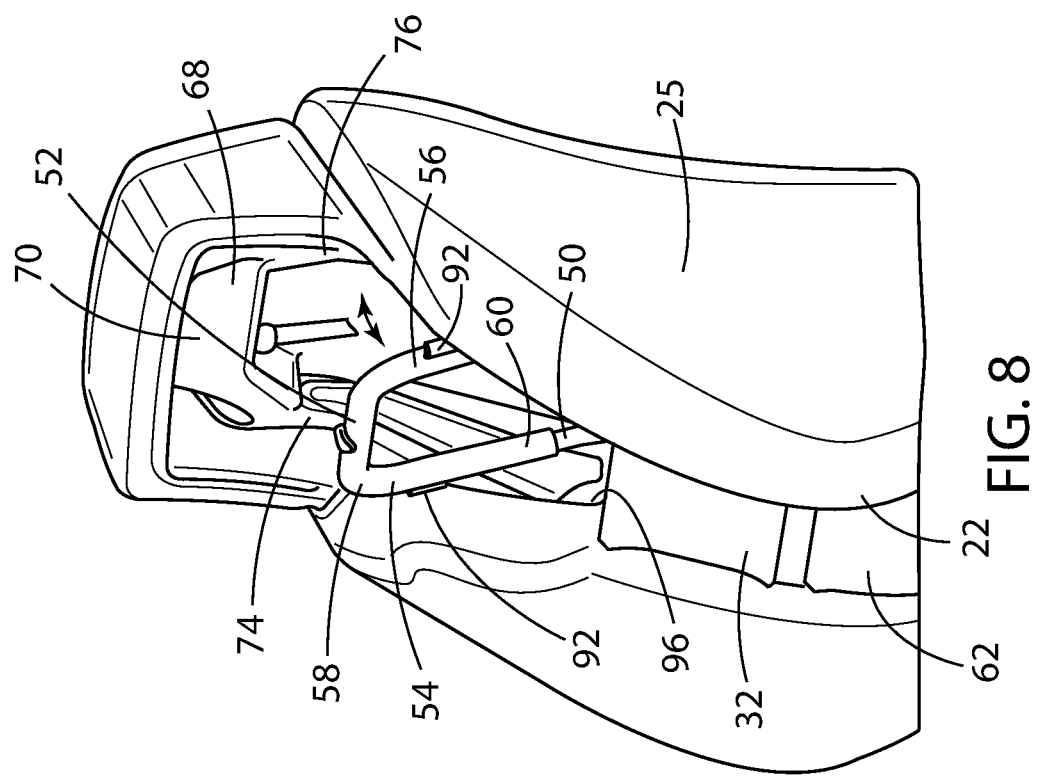
FIG. 8 is a front side perspective view of the automotive seat assembly of FIG. 1, wherein the seatback assembly is in the upright position, the moveable upper thoracic support bracket is in the fully raised position, and the moveable thoracic back support is detached.

As perhaps best shown in FIGS. 7 through 8 of the present disclosure and FIG. 7 of US 2018/0251052, the seatback assembly 14 includes a frame 68 having an upper transverse cross member 70 and a pair of opposed lateral seatback assembly frame members 74, 76 vertically depending from the upper transverse cross member 70. Each of the pair of opposed lateral seatback assembly frame members 74, 76 has the seatback assembly pivot 16 at a lower portion thereof that is operably coupled with the lower seating structure 12.

The moveable thoracic back support 40 may be fabricated from injection molded glass-filled nylon and shaped in a paddle-like configuration. The moveable thoracic back support 40 may further comprise a raised support 46 proximate an upper edge 48 of the moveable thoracic back support 40 and disposed beneath the moveable cushion 34. The raised support 46 may be fabricated from foam padding or some other resilient material, or may be integrally molded into the moveable thoracic back support 40, and is provided to ensure the desired height profile. The moveable thoracic back support 40 may include a pair of vertically depending legs 80, as shown in FIGS. 13 through 17. Ribs 82 may be provided on the pair of vertically depending legs 80 in order to provide stiffness and structural reinforcement.

The moveable thoracic back support 40 is operably coupled with a moveable upper thoracic support bracket 50. The moveable upper thoracic support bracket 50 may be pivotally attached at a first end 148 to one of the pair of opposed lateral seatback assembly frame members 74, 76 and pivotally attached at a second end 150 to the other of the pair of opposed lateral seatback assembly frame members 74, 76. The ratchet latch 44 may be used to pivotally couple the first end 148 of the moveable upper thoracic support bracket 50 to the inboard lateral seatback assembly frame member 74. The second end 150 of the moveable upper thoracic support bracket 50 is pivotally attached to the other lateral seatback assembly frame member 76 by a simple pivot 176. The ratchet latch 44 operably couples the first end 148 of the moveable upper thoracic support bracket 50 to the lateral seatback assembly frame member 74 to restrain the moveable upper thoracic support bracket 50 in one of a plurality of positions between the stowed position and the fully raised position. Displacement of the moveable thoracic back support 40 beyond the fully raised position actuates the ratchet latch 44 to an over-travel condition to return the ratchet latch 44 and the moveable thoracic back support 40 to the stowed position, as is known in the art. That is, when the moveable thoracic back support 40 is rotated beyond the last latch position corresponding to the fully raised position, the moveable thoracic back support 40 is returned to its design position by articulating full-forward and employing a spring (not shown) to pull the moveable thoracic back support 40 back to its design and fully stowed position.

Figure 9:
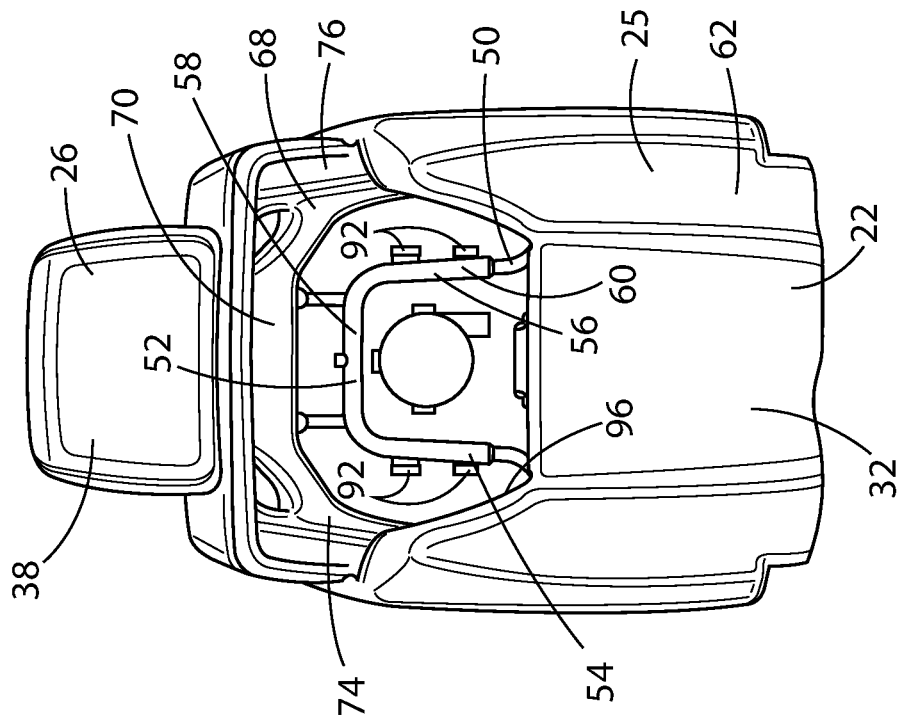
FIG. 9 is front view of the automotive seat assembly of FIG. 8.
Figure 10A:
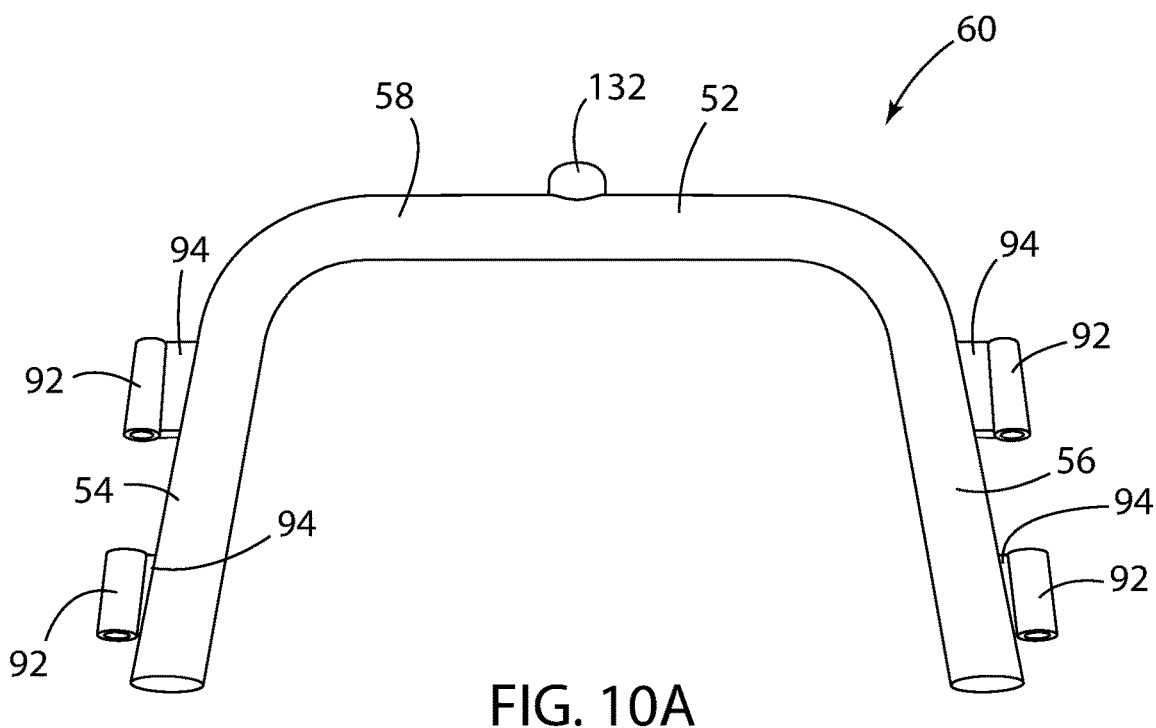
FIG. 10A is a perspective view of the outer casing of the moveable upper thoracic support bracket of the automotive seat assembly of FIG. 1.
Figure 10B:
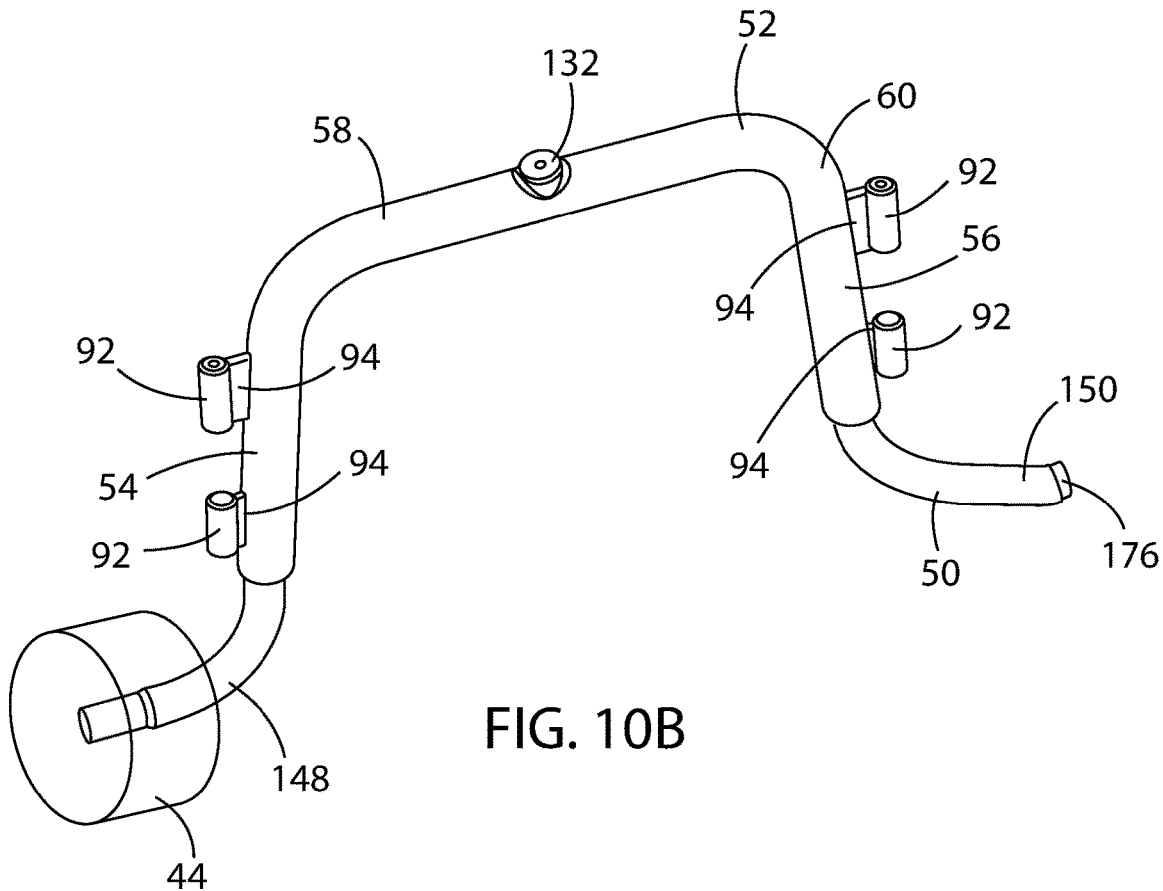
FIG. 10B is a perspective view of the outer casing disposed about an upper portion of the pair of upwardly and vertically extending lateral sections and the substantially horizontal central section of the moveable upper thoracic support bracket of the automotive seat assembly of FIG. 1.
Figure 11:
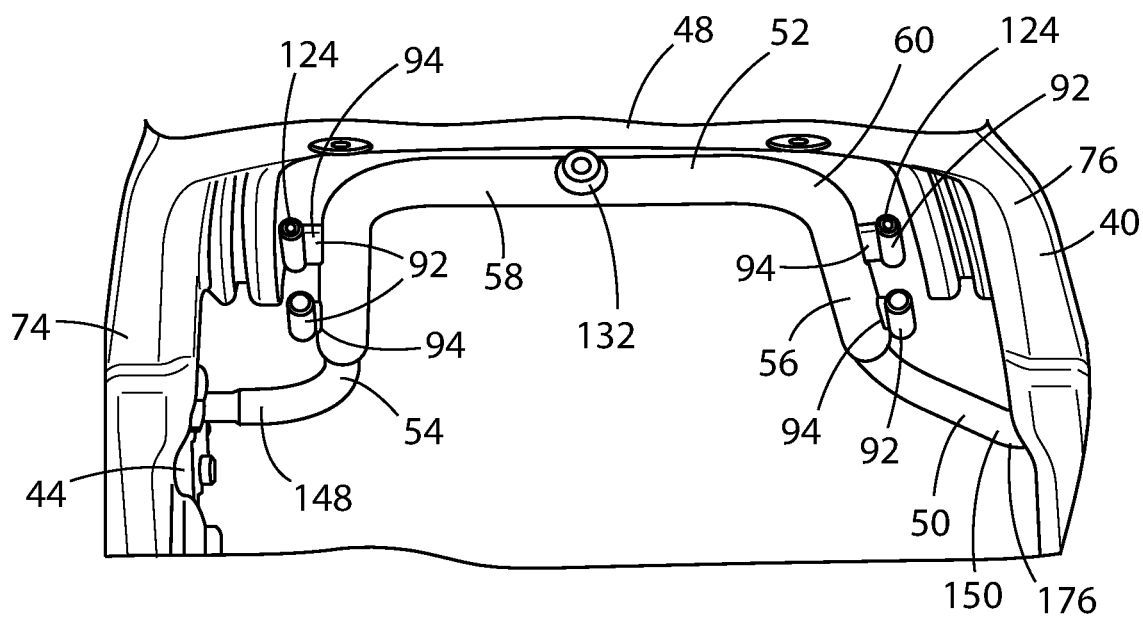
FIG. 11 is a top perspective view of the installed moveable upper thoracic support bracket of the automotive seat assembly of FIG. 1.
Figure 12:
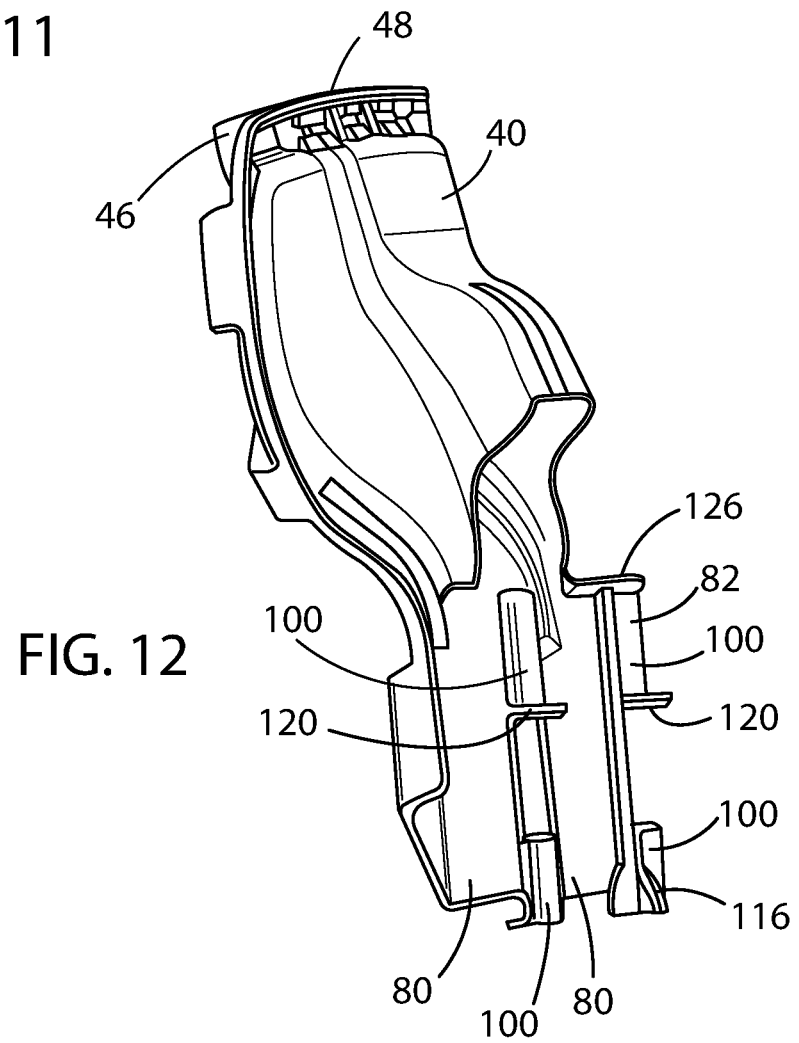
FIG. 12 is a side and rear perspective view of the moveable thoracic back support of the automotive seat assembly of FIG. 1.

The of the moveable upper thoracic support bracket 50 may include a central portion 52 to form a substantially U-shaped and upwardly extending configuration within a plane of the seatback assembly 14 when in the stowed position, as shown in FIG. 9. That is, the moveable upper thoracic support bracket 50 may include a pair of upwardly and vertically extending lateral sections 54, 56 interconnected via a substantially horizontal central section 58 to form a substantially U-shaped and upwardly extending tubular configuration within a plane of the seatback assembly when in the stowed position. Other configurations for the moveable upper thoracic support bracket 50 may be adopted. Preferably, an outer casing 60 of injection molded glass-filled nylon may be over-molded about the upper portion of the pair of upwardly and vertically extending lateral sections 54, 56 and the substantially horizontal central section 58 of the moveable upper thoracic support bracket 50, as shown in FIGS. 10A and 10B.

An attachment assembly 90 may be used to operably couple the moveable thoracic back support 40 to the moveable upper thoracic support bracket 50. The attachment assembly 90 may comprise a pair of mounting lugs 92, one each of which is disposed on either of one of the moveable upper thoracic support bracket 50 (as shown in the Figures) or the moveable thoracic back support 40. The attachment assembly 90 may also comprise a pair of mounting bosses 100, one each of which is disposed on the other of the moveable upper thoracic support bracket 50 (as shown in the Figures) or on the moveable thoracic back support 40.

As best shown in FIG. 9, the pair of mounting lugs 92 is disposed on the outer casing 60 and may also be injection over-molded with the outer casing 60 proximate the pair of upwardly and vertically extending lateral sections 54, 56. Alternatively, the pair of mounting lugs may 92 be formed with the moveable upper thoracic support bracket 50. As shown in the Figures, each of the pair of mounting lugs 92 may be formed as a cylindrical configuration disposed on an outer side of each of the pair of upwardly and vertically extending lateral sections 54, 56 of the moveable upper thoracic support bracket 50 and is operably coupled to the pair of upwardly and vertically extending lateral sections 54, 56 of the moveable upper thoracic support bracket 50 via a connecting web 94. It should be appreciated that the mounting lugs 92 may be shaped into shapes other than that of a cylindrical configuration.

Figure 13:
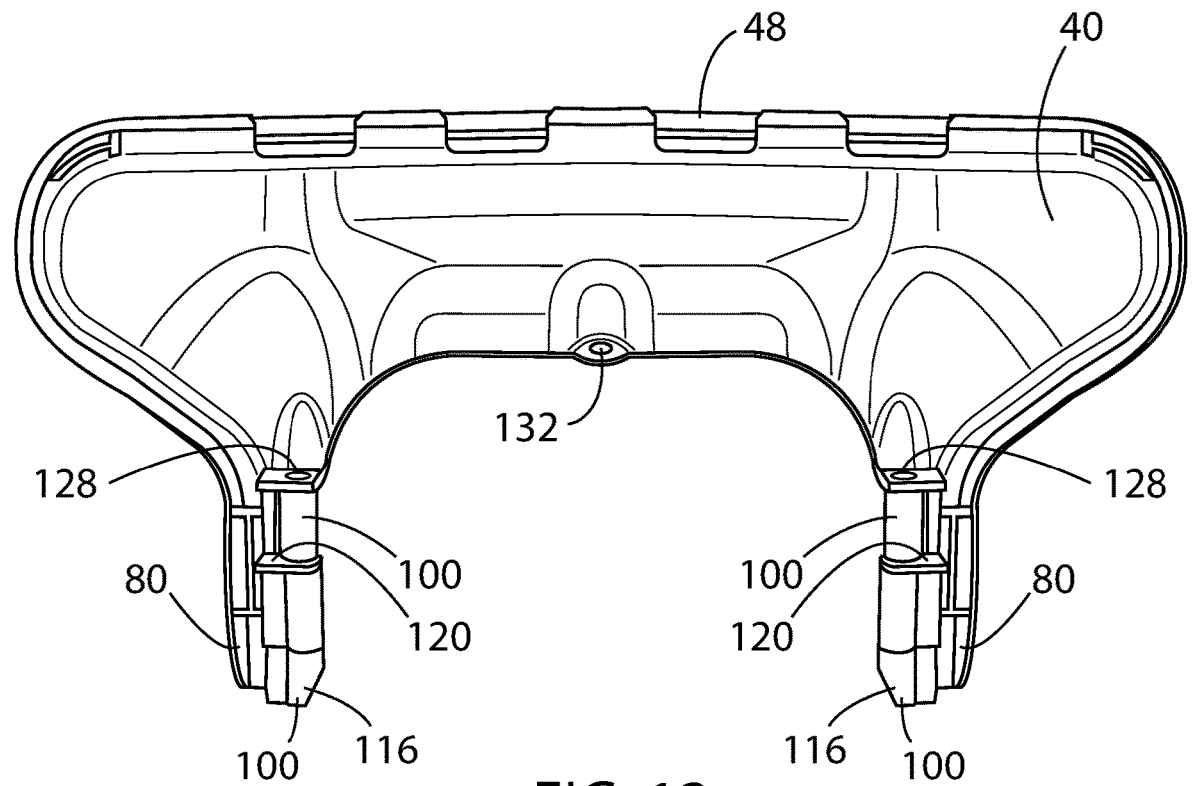
FIG. 13 is a rear view of the moveable thoracic back support of the automotive seat assembly of FIG. 1.
Figure 14:
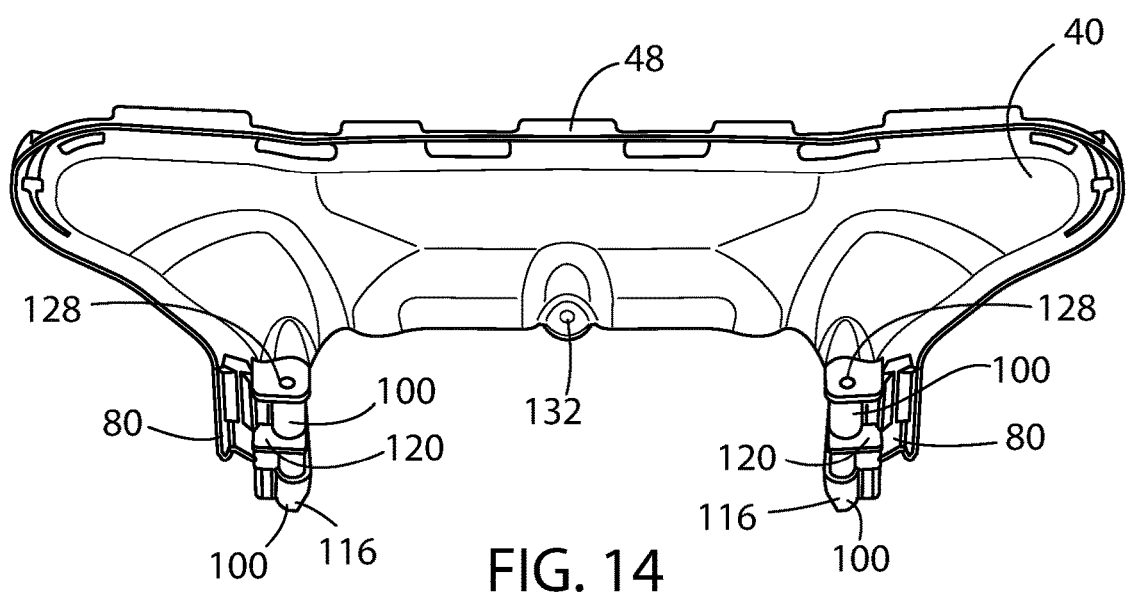
FIG. 14 is a top and rear perspective view of the moveable thoracic back support of the automotive seat assembly of FIG. 1.
Figure 15:
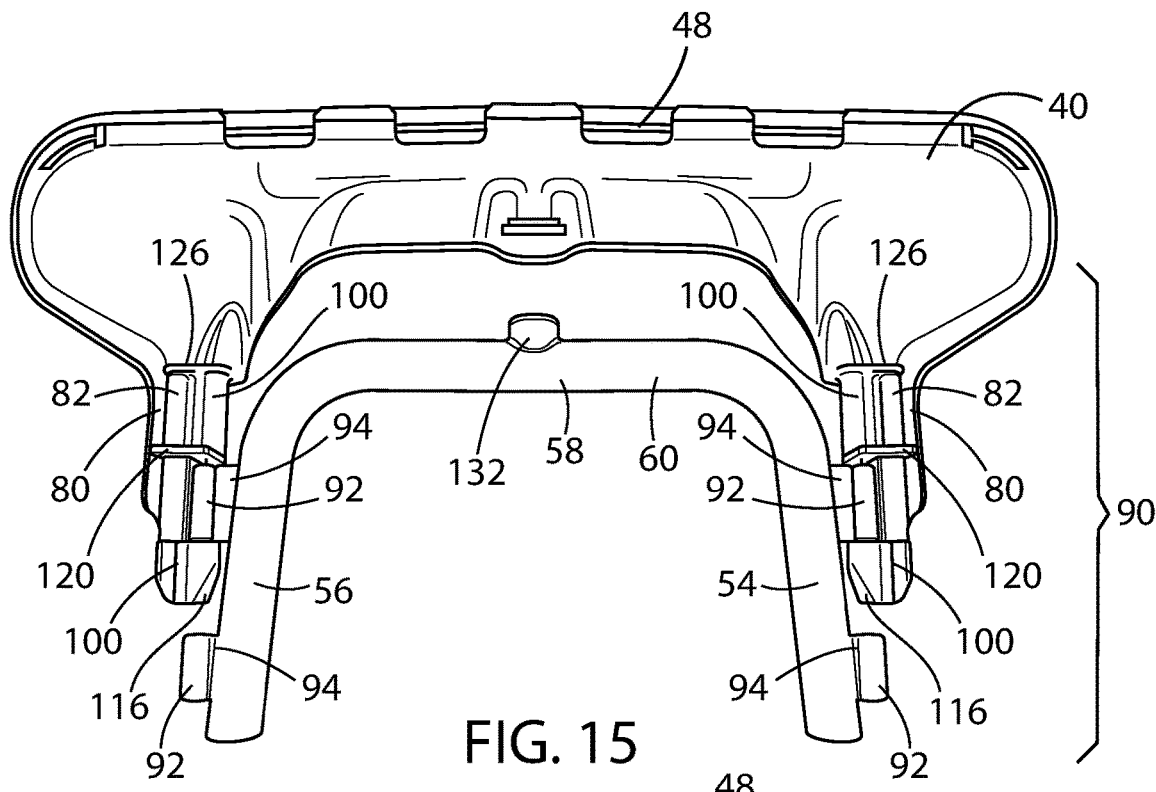
FIG. 15 is a rear view of an embodiment of the attachment assembly for attachment of the moveable thoracic back support to the moveable upper thoracic support bracket of the automotive seat assembly of FIG. 1, prior to assembly.
Figure 16:
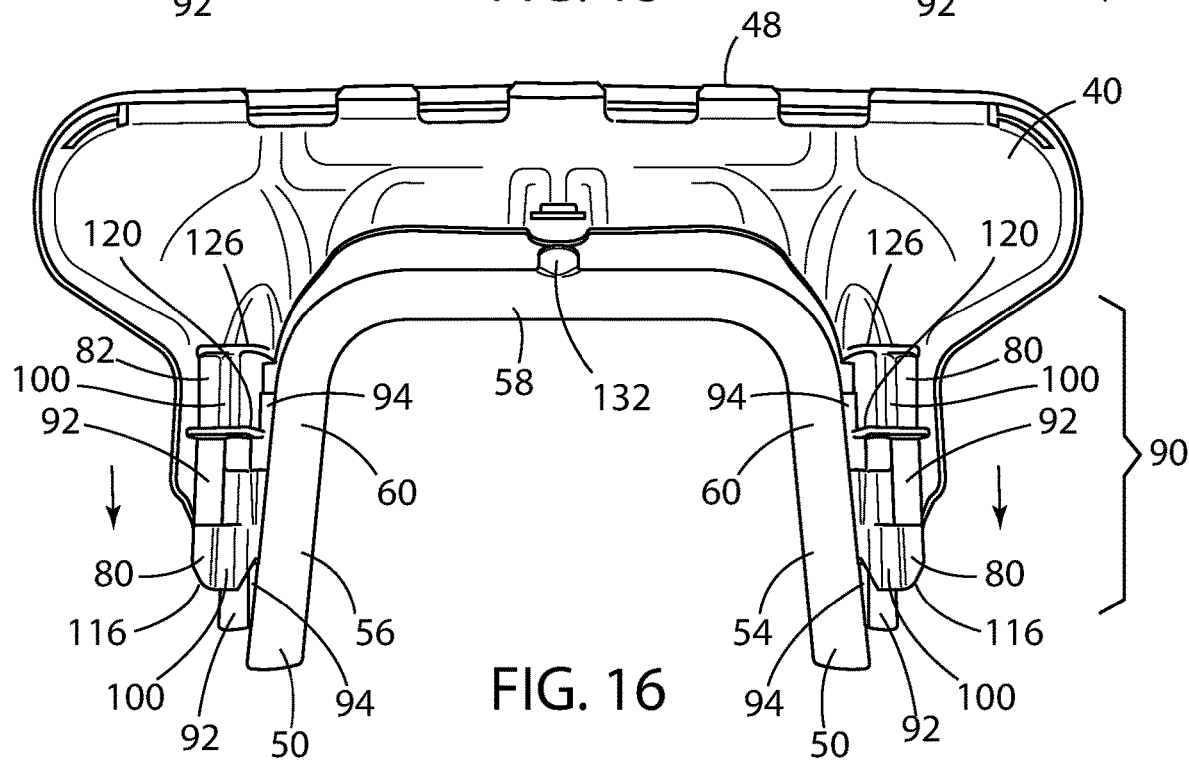
FIG. 16 is a rear view of the embodiment of the attachment assembly for attachment of the moveable thoracic back support with the moveable upper thoracic support bracket of the automotive seat assembly of FIG. 15, during assembly.
Figure 17:
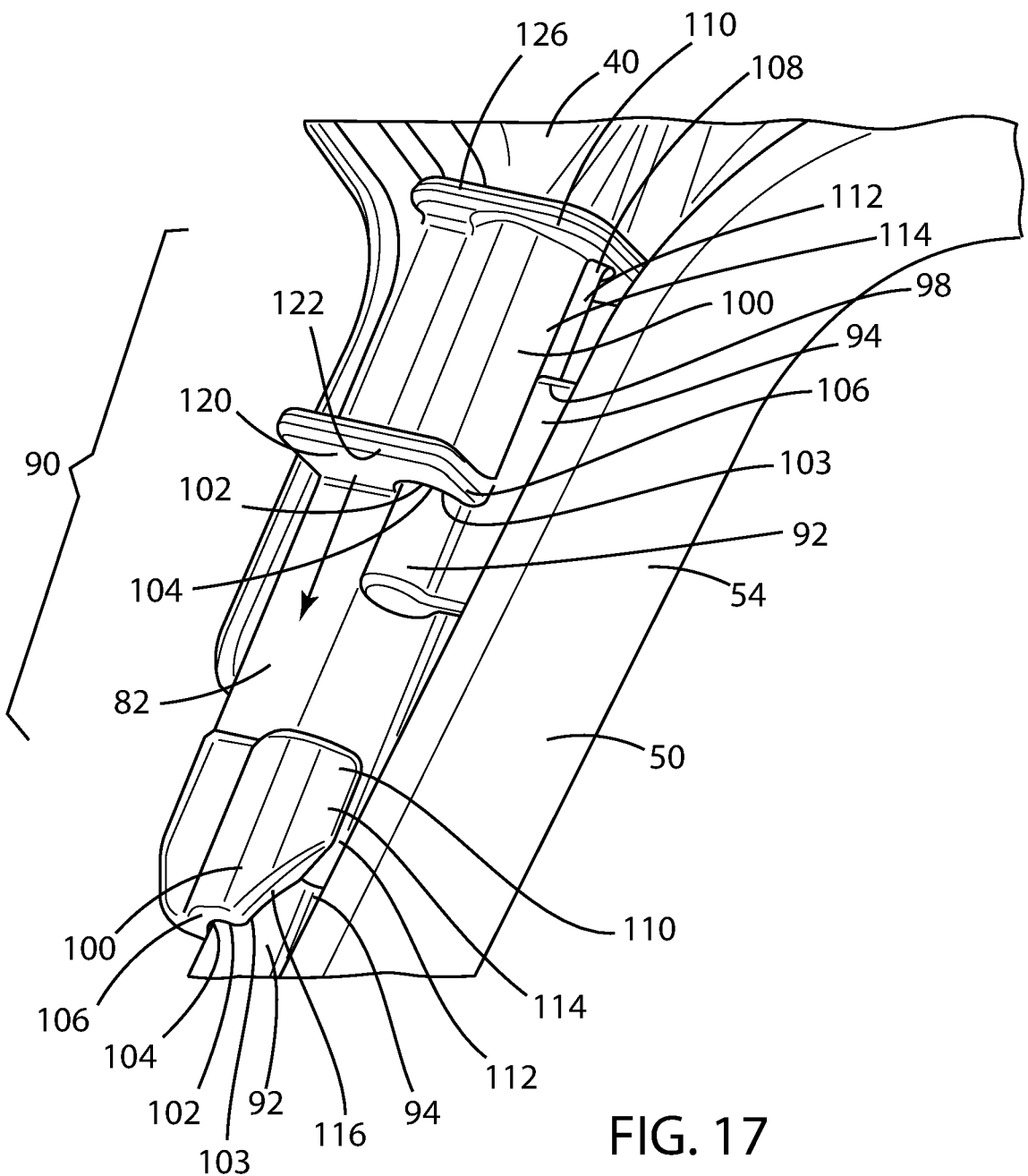
FIG. 17 is a rear perspective view of the moveable thoracic back support during assembly with the moveable upper thoracic support bracket of the automotive seat assembly of FIG. 1.
Figure 18:
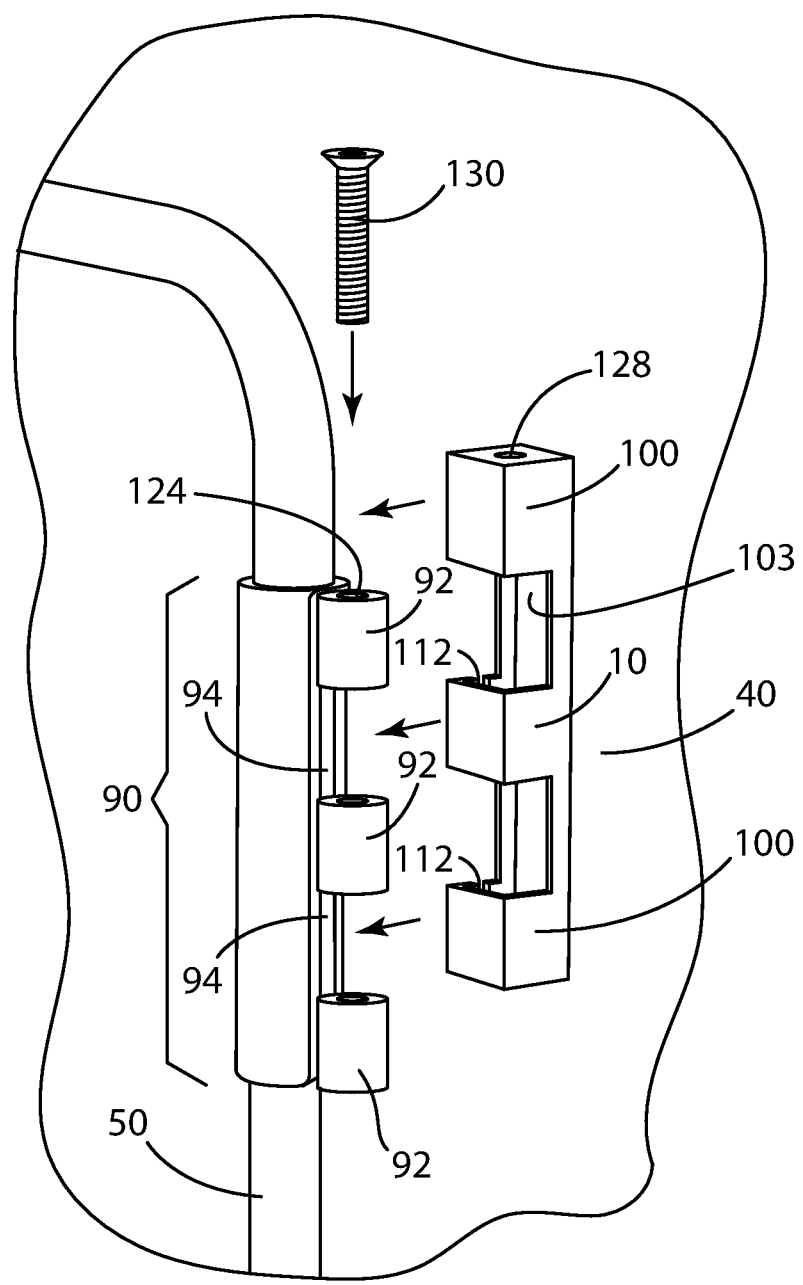
FIG. 18 is a rear perspective view of an alternative embodiment of the attachment assembly for attachment of the moveable thoracic back support to the moveable upper thoracic support bracket of the automotive seat assembly of FIG. 1.

The pair of mounting bosses 100 may be disposed on each of the pair of vertically depending legs 80 of the thoracic back support, as best seen in FIGS. 13 and 14. Each of the pair of mounting bosses 100 may include a vertical tube 102 having an open passage 104 at a lower distal end 106, a stop 108 at an upper proximal end 110, and a vertical slot 112 on a side portion 114 of the vertical tube 102 extending between the open passage 104 at the lower distal end 106 and the stop 108 at the upper proximal end 110, is best shown in FIG. 17. In the embodiment shown in FIGS. 12 through 17, the vertical tube 102 may form a substantially cylindrical interior cavity 103 within which each of the pair of mounting lugs 92 is received, further discussed below. Alternatively, as shown in the embodiment depicted in FIG. 18, the vertical tube 102 may form a substantially rectangular interior cavity 103 within which each of the pair of mounting lugs 92 is received. The vertical slot 112 on the side portion 114 of the vertical tube 102 of each of the pair of mounting bosses 100 may disposed on an inner side of the pair of vertically depending legs 80 of the moveable thoracic back support 40, as best shown in FIG. 17. A locator plane 120 may be disposed proximate the open passage 104 at the lower distal end 106 of the vertical tube 102. In addition, a slight chamfer 116 may be provided on the bottom of the pair of mounting bosses 100 to provide clearance for other components within the seatback assembly 14, as shown in FIG. 17.

As shown in FIGS. 10A through 17, each one of the pair of mounting lugs 92 may further include a plurality of mounting lugs 92 arranged in spaced vertical relation with each other and each one of the pair of mounting bosses 100 may further include a plurality of mounting bosses 100 arranged in spaced vertical relation with each other. The vertical spacing between the plurality of mounting lugs 92 and the vertical spacing between the plurality of segmented mounting bosses 100 allows the plurality of mounting bosses 100 to be placed in vertical alignment and interlocking relation with the plurality of mounting lugs 92 prior to moveable thoracic back support 40 being vertically lowered relative the lower seatback insert 32 during assembly of the seatback assembly 14, as discussed below. The stop 108 at the upper proximal end 110 of the lower mounting boss 100 of the plurality of mounting bosses 100 may be omitted to allow the connecting web 94 of the upper mounting lug 92 of the plurality of mounting lugs 92 to slide completely through the vertical slot 112 of the lower mounting boss 100 of the plurality of mounting bosses 100, as shown in FIG. 17.

In operation and in order to facilitate assembly of the moveable thoracic back support 40 onto the seatback assembly 14, the moveable thoracic back support 40 is horizontally moved and inserted into a cavity 96 on the upper and forward portion of the seatback assembly 14, as shown in FIG. 7. The locator plane 120 disposed proximate the open passage 104 at the lower distal end 106 of the vertical tube 102 may then be horizontally and vertically moved within the cavity 96 until it is placed upon an upper end of the mounting lug 92, such that the moveable thoracic back support 40 may be positively positioned by tactical feedback during insertion into the cavity 96 and prior to being vertically lowered relative the lower seatback insert 32 during assembly of the seatback assembly 14. That is, the flat bottom surface 122 of the locator plane 120, as best shown in FIG. 17, allows the operator to sit a locator plane 120 disposed on each of the pair of mounting bosses 100 on the top of the upper pair of mounting lugs 92. The operator may thereby use the locator plane 120 to locate the top of the mounting lugs 92 and continue to slide the moveable thoracic back support 40 rearward into the cavity 96 of the seatback assembly 14. When the open passage 104 at the lower distal end 106 of the upper pair of mounting bosses 100 becomes aligned with the upper pair of mounting lugs 92, the moveable thoracic back support 40 will naturally begin to fall down and slide over the pair of mounting lugs 92.

The pair of mounting lugs 92 may be thus aligned with the pair of mounting bosses 100 as the moveable thoracic back support 40 is horizontally positioned above the lower seatback insert 32. With the pair of mounting lugs 92 and mounting bosses 100 thus aligned, each of the pair of mounting lugs 92 are received within a corresponding one of the pair of mounting bosses 100 via the open passage 104 at the lower distal end 106. The connecting web 94 of the mounting lug 92 is also received within the vertical slot 112 of the mounting boss 100. The moveable thoracic back support 40 may thus be vertically lowered relative the lower seatback insert 32 during assembly of the seatback assembly 14, whereby each of the pair of mounting lugs 92 may be inserted into the vertical tube 102 of the corresponding one of the pair of mounting bosses 100 until an upper edge 98 of the connecting web 94, as best seen in FIG. 17, is disposed in juxtaposed abutting relation with the stop 108 at the upper proximal end 110 of the vertical tube 102. The moveable thoracic back support 40 is thus operably coupled to the thoracic portion of the seatback assembly 14.

Each upper one of the pair of mounting lugs 92 may also include a vertically oriented hole 124 on a top end thereof and the upper proximal end 110 of each of the upper pair of mounting bosses 100 may include a top wall 126 through which extends a corresponding and aligned vertically oriented hole 128 relative the vertically oriented hole 124 on the top end of each one of the pair of mounting lugs 92. Each of the upper one of the pair of mounting lugs 92 can be fastened to each one of the pair of mounting bosses 100 via a fastener 130 at the conclusion of the assembly of the seatback assembly 14. This may be accomplished by placing the now assembled moveable thoracic back support 40 and moveable upper thoracic support bracket 50 forward to the raised position to expose the top wall 126 on each of the upper pair of mounting bosses 100 and a central boss 132 formed on the substantially horizontal central portion 52 of the outer casing 60 of the moveable upper thoracic support bracket 50.

In addition, at this time, any final wire connections can be completed. For example, the moveable thoracic back support 40 may represent a modular subassembly, and may be provided with additional features, such as an integrated blower assembly (not shown) for seating ventilation and cooling, in addition to the foam and trim components discussed above. A trim piece or cover (not shown) may then be attached to the rear of the moveable thoracic back support 40 and moveable upper thoracic support bracket 50, such as by a hook and loop fastener, to conceal the attachment assembly 90.

The assembling operation for operably coupling the moveable thoracic back support 40 to the seatback assembly 14 is thus simplified, and includes the steps of: horizontally positioning the moveable thoracic back support 40 above the lower seatback insert 32; aligning the pair of mounting lugs 92 with the pair of mounting bosses 100; positioning the moveable thoracic back support 40 such that the pair of mounting lugs 92 are received within the pair of mounting bosses 100; vertically lowering the moveable thoracic back support 40 relative the lower seatback insert 32 until the pair of mounting lugs 92 are seated within the pair of mounting bosses 100; and attaching the pair of mounting lugs 92 to the pair of mounting bosses 100.

The seatback assembly 14 thus described uniquely resolved the problem of assembly of the moveable thoracic back support 40 by the use of aligned mounting lugs 92, mounting bosses 100, and locator planes 120 that enable the ready assembly of the seatback assembly 14. The moveable thoracic back support 40 for the thorax portion of the seatback assembly 14 may be pre-fabricated as a modular assembly, in addition to the mechanisms and structures already assembled within the seatback assembly 14. To facilitate such modularity, the shape of the moveable thoracic back support 40 matches the shape of the outer casing 60 of the moveable upper thoracic support bracket 50, and interferences that may restrict allowable assembly motion to the fore and aft direction only are overcome.

It will be understood by one having ordinary skill in the art that construction of the present disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or with the two components. Such joining may be permanent in nature or may be removeable or releasable in nature unless otherwise stated.

For purposes of this disclosure, the term "operably connected" generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

We claim:

1. A seatback assembly comprising:
   a pair of lateral seatback assembly frame members and a lower seatback insert;
   a moveable thoracic back support defining a support surface operably coupled with a moveable upper thoracic support bracket operably attached to the pair of lateral seatback assembly frame members, the moveable upper thoracic support bracket being selectively positioned in one of a plurality of positions between a fully stowed position and a fully raised position; and
   an attachment assembly operably coupling the moveable thoracic back support to the moveable upper thoracic support bracket, the attachment assembly comprising a pair of mounting lugs, one each of which is disposed on either of one of the moveable upper thoracic support bracket or the moveable thoracic back support, and a pair of mounting bosses, one each of which is disposed on the other of the moveable upper thoracic support bracket or the moveable thoracic back support, wherein the pair of mounting lugs are aligned with the pair of mounting bosses as the moveable thoracic back support is horizontally positioned above the lower seatback insert and the pair of mounting lugs are received within the pair of mounting bosses as the moveable thoracic back support is vertically lowered relative the lower seatback insert during assembly of the seatback assembly.

2. The seatback assembly of claim 1, wherein:
   the moveable upper thoracic support bracket comprises a pair of upwardly and vertically extending lateral sections interconnected via a substantially horizontal central section to form a substantially U-shaped and upwardly extending frame within a plane of the seatback assembly when in the stowed position; and
   the moveable thoracic back support comprises a pair of vertically depending legs.

3. The seatback assembly of claim 2, wherein:
   one of the pair of mounting lugs is disposed on each of the pair of upwardly and vertically extending lateral sections of the moveable upper thoracic support bracket and is operably coupled to the pair of upwardly and vertically extending lateral sections of the moveable upper thoracic support bracket via a connecting web; and
   one of the pair of mounting bosses is disposed on each of the pair of vertically depending legs of the thoracic back support.

4. The seatback assembly of claim 3, wherein:
   an outer casing is disposed about an upper portion of the pair of upwardly and vertically extending lateral sections and the substantially horizontal central section of the moveable upper thoracic support bracket, wherein the pair of mounting lugs is disposed on the upper portion of the pair of upwardly and vertically extending lateral sections of the moveable upper thoracic support bracket.

5. The seatback assembly of claim 4, wherein the outer casing is injection over-molded about the upper portion of the pair of upwardly and vertically extending lateral sections and the substantially horizontal central section of the moveable upper thoracic support bracket, and the pair of mounting lugs is injection over-molded proximate the pair of upwardly and vertically extending lateral sections of the moveable upper thoracic support bracket.

6. The seatback assembly of claim 3, wherein each of the pair of mounting bosses comprises a vertical tube having an open passage at a lower distal end, a stop at an upper proximal end, and a vertical slot on a side portion of the vertical tube extending between the open passage at the lower distal end and the stop at the upper proximal end, and wherein each of the pair of mounting lugs is received within a corresponding one of the pair of mounting bosses via the open passage at the lower distal end and the connecting web of the moveable upper thoracic support bracket is received within the vertical slot, whereby each of the pair of mounting lugs may be inserted into the vertical tube of the corresponding one of the pair of mounting bosses until an upper edge of the connecting web is disposed in juxtaposed abutting relation with the stop at the upper proximal end of the vertical tube.

7. The seatback assembly of claim 6, wherein the pair of mounting lugs are formed as a cylindrical configuration and the vertical tube forms a substantially cylindrical interior cavity within which each of the pair of mounting lugs is received.

8. The seatback assembly of claim 6, wherein the vertical tube forms a substantially rectangular interior cavity within which each of the pair of mounting lugs is received.

9. The seatback assembly of claim 6, wherein a locator plane is disposed proximate the open passage at the lower distal end of the vertical tube by which the moveable thoracic back support may be positioned prior to being vertically lowered relative the lower seatback insert during assembly of the seatback assembly.

10. The seatback assembly of claim 3, wherein each one of the pair of mounting lugs comprises a plurality of mounting lugs arranged in spaced vertical relation with each other and each one of the pair of mounting bosses comprises a plurality of mounting bosses arranged in spaced vertical relation with each other, and wherein a spacing between the plurality of mounting lugs and a spacing between the plurality of mounting bosses allows the plurality of mounting bosses to be placed in vertical alignment with the plurality of mounting lugs prior to being vertically lowered relative the lower seatback insert during assembly of the seatback assembly.

11. The seatback assembly of claim 10, wherein each of the pair of mounting bosses comprises a vertical tube having an open passage at a lower distal end, a stop at an upper proximal end, and a vertical slot on a side portion of the vertical tube extending between the open passage at the lower distal end and the stop at the upper proximal end, and wherein each of the pair of mounting lugs is received within a corresponding one of the pair of mounting bosses via the open passage at the lower distal end and the connecting web of the moveable upper thoracic support bracket is received within the vertical slot, whereby each of the pair of mounting lugs may be inserted into the vertical tube of the corresponding one of the pair of mounting bosses until an upper edge of the connecting web is disposed in juxtaposed abutting relation with the stop at the upper proximal end of the vertical tube.

12. The seatback assembly of claim 11, wherein each of the pair of mounting lugs is disposed on an outer side of each of the pair of upwardly and vertically extending lateral sections of the moveable upper thoracic support bracket and the vertical slot on the side portion of the vertical tube of each of the pair of mounting bosses is disposed on an inner side of the pair of vertically depending legs of the thoracic back support.

13. The seatback assembly of claim 1, wherein:
the lower seatback insert has an outer trim defining a first support surface and the moveable thoracic back support has an outer trim defining a second support surface, and wherein the first support surface and second support surface are substantially co-planar when the moveable upper thoracic support bracket is in the fully stowed position and the second support surface is raised above the first support surface when the moveable upper thoracic support bracket is not positioned in the fully stowed position.

14. The seatback assembly claim 1, further comprising a latch operably coupling a first end of the moveable upper thoracic support bracket to the one of the pair of lateral seatback assembly frame members to restrain the moveable upper thoracic support bracket in one of the plurality of positions between the stowed position and the fully raised position.

15. A motor vehicle seating assembly comprising:
a seatback assembly comprising a lower seatback insert and pivotable between an upright position and a fully reclined position operably coupled with a lower seating structure, the seatback assembly comprising a frame having a pair of opposed lateral seatback assembly frame members;
a moveable thoracic back support operably coupled with a moveable upper thoracic support bracket pivotally attached at a first end to one of the pair of opposed lateral seatback assembly frame members and pivotally attached at a second end to the other of the pair of opposed lateral seatback assembly frame members, a pair of mounting bosses disposed on each of a pair of vertically depending legs, a latch operably coupling a first end of the moveable upper thoracic support bracket to the one of a pair of opposed lateral seatback assembly frame members to restrain the moveable upper thoracic support bracket in one of a plurality of positions between a stowed position and a fully raised position, and a cushion defining a moveable surface of the moveable thoracic back support, wherein the moveable upper thoracic support bracket comprises a pair of upwardly and vertically extending lateral sections interconnected via a substantially horizontal central section to form a substantially U-shaped and upwardly extending frame within a plane of the seatback assembly when in the stowed position; and
an attachment assembly operably coupling the moveable thoracic back support to the moveable upper thoracic support bracket, the attachment assembly comprising a pair of mounting lugs, one each of which is disposed on either of one of the pair of vertically extending lateral sections of the moveable upper thoracic support bracket or one of the pair of vertically depending legs of the moveable thoracic back support, and a pair of mounting bosses, one each of which is disposed on either of the other one of the pair of vertically extending lateral sections of the moveable upper thoracic support bracket or the other one of the pair of vertically depending legs of the moveable thoracic back support, wherein the pair of mounting lugs are aligned with the pair of mounting bosses as the moveable thoracic back support is horizontally positioned above the lower seatback insert and the pair of mounting lugs are received within the pair of mounting bosses as the moveable thoracic back support is vertically lowered relative the lower seatback insert during assembly of the seatback assembly.

16. The motor vehicle seating assembly of claim 15, wherein each one of the pair of mounting lugs comprises a plurality of mounting lugs arranged in spaced vertical relation with each other and each one of the pair of mounting bosses comprises a plurality of mounting bosses arranged in spaced vertical relation with each other, and wherein a spacing between the plurality of mounting lugs and a spacing between the plurality of mounting bosses allows the plurality of mounting bosses to be placed in vertical alignment with the plurality of mounting lugs prior to being vertically lowered relative the lower seatback insert during assembly of the seatback assembly, and each one of the pair of mounting lugs is operably coupled to the pair of upwardly and vertically extending lateral sections of the moveable upper thoracic support bracket via a connecting web; and wherein each of the pair of mounting bosses comprises a vertical tube having an open passage at a lower distal end, a stop at an upper proximal end, and a vertical slot on a side portion of the vertical tube extending between the open passage at the lower distal end and the stop at the upper proximal end, and wherein each of the pair of mounting lugs is received within a corresponding one of the pair of mounting bosses via the open passage at the lower distal end and the connecting web of the moveable upper thoracic support bracket is received within the vertical slot, whereby each of the pair of mounting lugs may be inserted into the vertical tube of the corresponding one of the pair of mounting bosses until an upper edge of the connecting web is disposed in juxtaposed abutting relation with the stop at the upper proximal end of the vertical tube.

17. The motor vehicle seating assembly of claim 16, wherein the each one of the pair of mounting lugs comprises a vertically oriented hole on a top end thereof and the upper proximal end of each of the pair of mounting bosses comprises a top wall through which extends a corresponding and aligned vertically oriented hole relative the vertically oriented hole on the top end of each one of the pair of mounting lugs, whereby each one of the pair of mounting lugs can be fastened to each one of the pair of mounting bosses during assembly of the seatback assembly.

18. A method for assembling a seatback assembly comprising:
a pair of lateral seatback assembly frame members;
a lower seatback insert;
a moveable upper thoracic support bracket pivotally attached at a first end to one of the pair of lateral seatback assembly frame members and pivotally attached at a second end to the other of the pair of lateral seatback assembly frame members, the moveable upper thoracic support bracket being selectively positioned in one of a plurality of positions between a fully stowed position and a fully raised position;
a moveable thoracic back support defining a support surface operably coupled with the moveable upper thoracic support bracket; and
an attachment assembly operably coupling the moveable thoracic back support to the moveable upper thoracic support bracket, the attachment assembly comprising a pair of mounting lugs, each of which is disposed on either the moveable upper thoracic support bracket or the moveable thoracic back support, and a pair of mounting bosses, each of which is disposed on the other of the moveable upper thoracic support bracket or the moveable thoracic back support;

wherein the method comprises the steps of:
horizontally positioning the moveable thoracic back support above the lower seatback insert;
aligning the pair of mounting lugs with the pair of mounting bosses;
positioning the moveable thoracic back support such that the pair of mounting lugs are received within the pair of mounting bosses;
vertically lowering the moveable thoracic back support relative the lower seatback insert until the pair of mounting lugs are seated within the pair of mounting bosses; and
attaching the pair of mounting lugs to the pair of mounting bosses.

19. The method of claim 18, wherein each one of the pair of mounting lugs comprises a plurality of mounting lugs arranged in spaced vertical relation with each other and each one of the pair of mounting bosses comprises a plurality of mounting bosses arranged in spaced vertical relation with each other, and wherein a spacing between the plurality of mounting lugs and a spacing between the plurality of mounting bosses allows the plurality of mounting bosses to be placed in vertical alignment with the plurality of mounting lugs prior to being vertically lowered relative the lower seatback insert; and wherein each of the pair of mounting bosses comprises a vertical tube having an open passage at a lower distal end, a stop at an upper proximal end, and a vertical slot on a side portion of the vertical tube extending between the open passage at the lower distal end and the stop at the upper proximal end;

whereby the step of positioning the moveable thoracic back support such that the pair of mounting lugs are received within the pair of mounting bosses includes the further step of positioning a connecting web on each of the pair of mounting lugs within the vertical slot on a corresponding each of the pair of mounting bosses; and the step of vertically lowering the moveable thoracic back support relative the lower seatback insert until the pair of mounting lugs are seated within the pair of mounting bosses is complete upon an upper edge of the connecting web of each of the pair of mounting lugs being disposed in juxtaposed abutting relation with the stop at the upper proximal end of the vertical tube.

20. The method of claim 19, wherein a locator plane is disposed proximate the open passage at the lower distal end of the vertical tube, and whereby the step of vertically positioning the moveable thoracic back support such that the pair of mounting lugs are received within the pair of mounting bosses is completed by placing the locator plane upon an upper end of each of the pair of mounting lugs prior to the step of further vertically lowering the moveable thoracic back support relative the lower seatback insert until the pair of mounting lugs are seated within the pair of mounting bosses.

* * * * *